(12) United States Patent
Zha et al.

(10) Patent No.: US 11,558,637 B1
(45) Date of Patent: Jan. 17, 2023

(54) UNIFIED SEARCH WINDOW TO SUPPORT MULTIPLE VIDEO ENCODING STANDARDS

(71) Applicant: Meta Platforms, Inc., Menlo Park, CA (US)

(72) Inventors: Xianliang Zha, El Dorado Hills, CA (US); Harikrishna Madadi Reddy, San Jose, CA (US); Junqiang Lan, Fremont, CA (US); Sujith Srinivasan, Cupertino, CA (US); Chung-Fu Lin, Menlo Park, CA (US); Guogang Hua, San Diego, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

(21) Appl. No.: 16/716,001

(22) Filed: Dec. 16, 2019

(51) Int. Cl.
*H04N 19/56* (2014.01)
*H04N 19/132* (2014.01)
*H04N 19/139* (2014.01)
*H04N 19/176* (2014.01)
*H04N 19/105* (2014.01)
*H04N 19/43* (2014.01)

(52) U.S. Cl.
CPC ........... *H04N 19/56* (2014.11); *H04N 19/105* (2014.11); *H04N 19/132* (2014.11); *H04N 19/139* (2014.11); *H04N 19/176* (2014.11); *H04N 19/43* (2014.11)

(58) Field of Classification Search
CPC .. H04N 19/176; H04N 19/593; H04N 19/159; H04N 19/105; H04N 19/52; H04N 19/11; H04N 19/137; H04N 19/503; H04N 19/513; H04N 19/139; H04N 19/51; H04N 19/567
See application file for complete search history.

(56) References Cited

U.S. PATENT DOCUMENTS

| | | | | |
|---|---|---|---|---|
| 9,357,228 B2* | 5/2016 | Au | ......................... | H04N 19/57 |
| 9,998,750 B2* | 6/2018 | Rodriguez | ............. | H04N 19/56 |
| 2007/0206675 A1* | 9/2007 | Tanaka | .................. | H04N 19/127 |
| | | | | 375/E7.262 |
| 2007/0242752 A1* | 10/2007 | Kuzuya | ................. | H04N 19/533 |
| | | | | 375/E7.1 |
| 2007/0291857 A1* | 12/2007 | Hussain | ................. | H04N 19/44 |
| | | | | 375/240.29 |
| 2008/0126278 A1* | 5/2008 | Bronstein | ............ | H04N 19/567 |
| | | | | 706/17 |
| 2009/0022412 A1* | 1/2009 | Okada | .................... | H04N 19/40 |
| | | | | 382/240 |

(Continued)

*Primary Examiner* — Daniel Chang
(74) *Attorney, Agent, or Firm* — Van Pelt, Yi & James LLP

(57) ABSTRACT

A system comprises a memory storage configured to store at least a portion of a frame of a video and a hardware motion estimation search processing unit configured to perform at least a portion of a motion estimation search for the video for a plurality of different block sizes. The hardware motion estimation search processing unit is configured to perform the motion estimation search using a plurality of source sub-blocks of a first block size to determine a first type of comparison evaluation values for the first block size. A combination of values included in the first type of comparison evaluation values is utilized to determine at least one second type of comparison evaluation values for a second block size, wherein the second block size is larger than the first block size.

20 Claims, 22 Drawing Sheets

(56) References Cited

U.S. PATENT DOCUMENTS

| | | | |
|---|---|---|---|
| 2009/0109342 A1* | 4/2009 | Heng | H04N 19/198 348/699 |
| 2011/0129015 A1* | 6/2011 | Nguyen | H04N 19/51 375/E7.104 |
| 2011/0194025 A1* | 8/2011 | Chen | H04N 19/53 348/452 |
| 2012/0170660 A1* | 7/2012 | Novotny | H04N 19/56 375/240.16 |
| 2012/0257678 A1* | 10/2012 | Zhou | H04N 19/176 375/E7.243 |
| 2013/0016783 A1* | 1/2013 | Kim | H04N 19/147 375/E7.243 |
| 2013/0034166 A1* | 2/2013 | Shiodera | H04N 19/70 375/E7.243 |
| 2013/0148732 A1* | 6/2013 | Tanner | H04N 19/53 375/E7.125 |
| 2013/0294519 A1* | 11/2013 | Gilmutdinov | G09G 5/393 375/240.16 |
| 2014/0037005 A1* | 2/2014 | Lee | H04N 19/53 375/E7.243 |
| 2014/0044368 A1* | 2/2014 | Tanner | H04N 19/53 382/236 |
| 2014/0086310 A1* | 3/2014 | Tanner | H04N 19/156 375/240.03 |
| 2014/0219531 A1* | 8/2014 | Epstein | G01R 33/56308 382/131 |
| 2014/0269919 A1* | 9/2014 | Rodriguez | H04N 19/40 375/240.16 |
| 2015/0256850 A1* | 9/2015 | Kottke | H04N 19/513 375/240.16 |
| 2016/0021385 A1* | 1/2016 | Chou | H04N 19/513 375/240.16 |
| 2016/0073111 A1* | 3/2016 | Lee | H04N 19/124 375/240.03 |
| 2016/0191946 A1* | 6/2016 | Zhou | H04N 19/17 375/240.16 |
| 2017/0070745 A1* | 3/2017 | Lee | H04N 19/147 |
| 2017/0094304 A1* | 3/2017 | Chou | H04N 19/523 |
| 2018/0041770 A1* | 2/2018 | Holland | H04N 19/176 |
| 2018/0176565 A1* | 6/2018 | Tanner | H04N 19/154 |
| 2018/0310013 A1* | 10/2018 | Tanner | H04N 19/53 |
| 2019/0230365 A1* | 7/2019 | Tanner | H04N 19/122 |
| 2020/0099926 A1* | 3/2020 | Tanner | H04N 19/97 |

* cited by examiner

UNIFIED SEARCH WINDOW TO SUPPORT MULTIPLE VIDEO ENCODING STANDARDS

BACKGROUND OF THE INVENTION

Video encoding involves expensive and resource intensive operations. In particular, one significantly challenging step in video encoding is motion estimation. Comparing source data to reference data to determine motion vectors can require considerable data bandwidth and processor computation, among other requirements. Moreover, as the target audience of the video increases, the number of supported video formats significantly increases.

BRIEF DESCRIPTION OF THE DRAWINGS

Various embodiments of the invention are disclosed in the following detailed description and the accompanying drawings.

FIG. 7 is a diagram illustrating an embodiment of a source frame block for performing a motion estimation search.

FIGS. 13A-G are diagrams illustrating different embodiments of partition configurations utilizing a sub-block unit.

DETAILED DESCRIPTION

Figure 1:
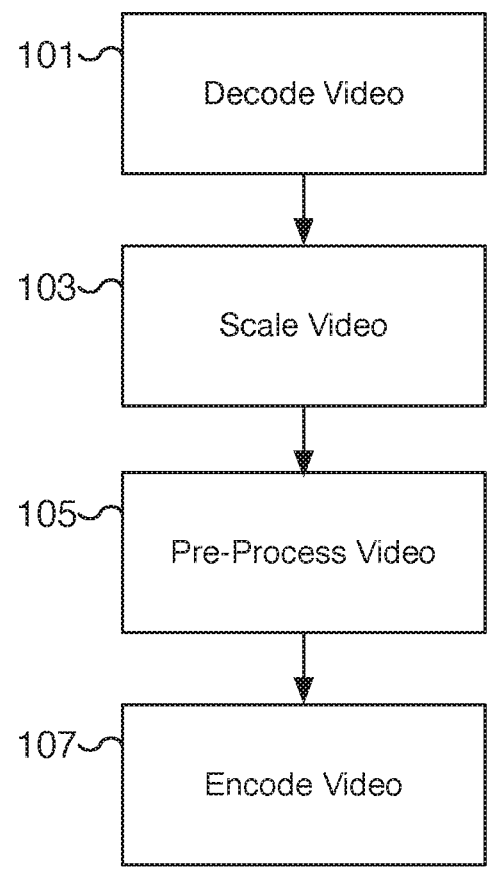
FIG. 1 is a flow chart illustrating an embodiment of a process for performing video conversion.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Typically, tradeoffs are made to achieve either performance or video quality requirements. These tradeoffs become even more difficult when the video needs to be encoded in close to real time. For a high quality video source, it is desirable to retain the high quality of the source video when encoding. Similarly, for a low quality video source, it is also desirable to encode with minimal loss in quality since any degradation on an already low quality source will be significant. One option is to focus on a single encoding format. But since there are often multiple competing encoding standards, a single encoding format has the disadvantage of limiting the encoded video's audience. Therefore, there is a need for a video encoding solution for motion estimation that achieves high quality video, is fast and computationally efficient, and is compatible with multiple encoding formats.

A unified search window for supporting multiple video encoding standards is disclosed. Using the described systems and techniques, hierarchical motion searches can be performed to convert video, including live video, in near real-time while retaining high quality in the converted video. The same hardware motion estimation search processing unit using a unified search window can process both a video down-sampled by a factor of 16 as well as the video down-sampled by a factor of 4. For example, the disclosed unified search window can perform motion estimations using a video down-sampled by a factor of 16 for a codec with a super block size of 64×64 and a video down-sampled by a factor of 4 for a codec with super block size of 64×64 or a micro block size of 16×16. In the example scenarios, 16 super blocks, 1 super block, or 16 micro blocks are computed in parallel in the respective down-sampled spaces. In some embodiments, a hierarchical motion search processing system is configured with one or more hardware motion estimation search processing units to process one or more reference frames in parallel. For example, a hierarchical motion search processing system can be configured with two or more hardware motion estimation search processing units that each receive the same source block but different reference frames. For each reference frame, a motion estimation search processing unit utilizes a unified search window to perform motion estimates using different block sizes in parallel. A source block is sub-divided into sub-blocks and motion estimates are first performed at a sub-block level of granularity. The results of the sub-block motion estimates are combined to determine motion estimates for one or more different block sizes, where each new block size is a combination of sub-blocks. For example, motion estimates for 4×8, 8×4, 8×8, 8×16, 16×8, and 16×16 partition sizes can be determined by combining different combinations of 4×4 pixel sub-block results. Moreover, motion estimates for each different partition configuration can be determined in parallel with minimal additional processing and computational resources. By improving the performance of performing a motion estimation search for multiple block sizes, the performance of the motion estimation portion of video encoding is significantly increased.

In some embodiments, a system comprises a memory storage configured to store at least a portion of a frame of a video. For example, a hierarchical motion search processing system includes access to a memory storage to retrieve portions of stored frames of a video including source frames and reference frames. The memory storage may include multiple versions of the video including multiple down-sampled versions. The system further comprises a hardware motion estimation search processing unit configured to perform at least a portion of a motion estimation for the video for a plurality of different block sizes. For example, a motion estimation can be performed for 4×4, 4×8, 8×4, 8×8, 8×16, 16×8, and/or 16×16 pixel blocks. The motion estimation results may be used as part of a video conversion process and in particular for performing hierarchical motion search operations as part of encoding the video into one or more different video formats. In some embodiments, the hardware motion estimation search processing unit is configured to perform the motion estimation search using a plurality of source sub-blocks of a first block size to determine a first type of comparison evaluation values for the first block size. For example, a source block, such as a 16×16 pixel block, is sub-divided into sub-blocks, such as 4×4 sub-blocks. The 4×4 sub-blocks are used to determine the first type of comparison evaluation values for the 4×4 pixel block size. In some embodiments, the comparison evaluation values are motion estimates using a sum of differences measurement. The combination of values included in the first type of comparison evaluation values is utilized to determine at least one second type of comparison evaluation value for a second block size, wherein the second block size is larger than the first block size. For example, results from 4×4 block size motion estimations are combined to determine motion estimates for 4×8, 8×4, 8×8, 8×16, 16×8, and/or 16×16 pixel blocks. Two 4×4 block size motion estimates are combined to determine a motion estimate for an 8×4 or 4×8 pixel block. Similarly, four 4×4 sub-block motion estimates are combined to compute the motion estimate for the corresponding 8×8 pixel block and eight 4×4 sub-block motion estimates are combined to compute the motion estimate for the corresponding 8×16 or 16×8 pixel block. To compute the motion estimate for a 16×16 pixel block, 16 sub-blocks are combined. In some embodiments, the second type of block size is a partition configuration made up of one or more sub-blocks. In various embodiments, the second type of comparison evaluation value is used to identify a motion vector for a portion of the reference frame where there exists redundant information.

FIG. 1 is a flow chart illustrating an embodiment of a process for performing video conversion. The process of FIG. 1 can be used to convert a video into one or more new encoding formats while compressing the video and also retaining a high video quality standard. The incoming video can be live video and the conversion can be performed in near real-time. In some embodiments, multiple encoding formats are supported and outputted in part to support a large number of supported devices and corresponding viewers. In some embodiments, the video encoding is a form of video compression.

At 101, a source video is decoded. For example, a source video is decoded from the source video format. The video format may be inspected to confirm that a video standard is met. In some embodiments, the source video is converted to uncompressed video. The source video may be a video file or live video, such as live streaming video. Depending on the source video, the quality of the video can range from very high to very low quality. The source video may also utilize different resolutions, bitrates, codecs, etc. and is decoded in anticipation of encoding to a new format. In some embodiments, the video is captured from mobile devices such as mobile phones with limited processing and power budgets. The video may be received as part of sharing the video with a larger audience on a video sharing platform. In some embodiments, the video sharing platform is a social networking platform.

At 103, the source video is scaled. For example, in some embodiments, a scaler unit converts the decoded source video to one or more different resolutions. In various embodiments, the source video is down-sampled to a lower resolution version. For example, the source video can be down-sampled by a factor of 16 and 4 to produce down-sampled versions for performing hierarchical motion searches. In some embodiments, each down-sampled version is a high quality version and retains a high standard of image quality despite the lower resolution. For example, each pixel in the down-sampled version is created by at least evaluating a group of neighboring pixels from a higher resolution video. Alternatively, in some embodiments, the down-sampled version is created by dropping pixels rather than evaluating a plurality of neighboring pixels. By dropping pixels, the down-sampled version is a down-sampled version with low image quality.

At 105, the video data is pre-processed. In some embodiments, the video may be enhanced by pre-processing the video prior to the video encoding step performed at 107. For example, one or more different image/video filters may be applied to the video for improving encoding performance and/or quality. In some embodiments, artifacts and/or other image irregularities may be removed to improve video quality. In some embodiments, statistics of the video may be extracted during the pre-processing step that can be used as input for later stages.

At 107, the video is encoded into one or more different formats. For example, the decoded video is encoded using one or more different video codecs. The encoded formats may include target parameters such as video resolution, bitrate, quality, etc. and may include compressing the video to remove redundancy such as spatial and temporal redundancy. As one part of the video encoding step, motion vectors are determined by a motion estimation search. For example, reference frames of the video are searched using portions of source frames to identify temporal redundancy. Depending on encoding parameters, past and/or future frames can be utilized as reference frames. In some embodiments, the motion vectors are found utilizing one or more motion estimation search processing units such as motion estimation search processing unit 1400 of FIG. 14. Using one or more motion estimation search processing units, a high quality hierarchical motion search using one or more different resolutions of the video is performed. The search results from the hierarchical motion search may be used in subsequent searches, such as integer and sub-pixel searches, to fine tune motion search results. Although the motion search step is just one portion of the video encoding process, it has significant computational and resource requirements.

Figure 14:
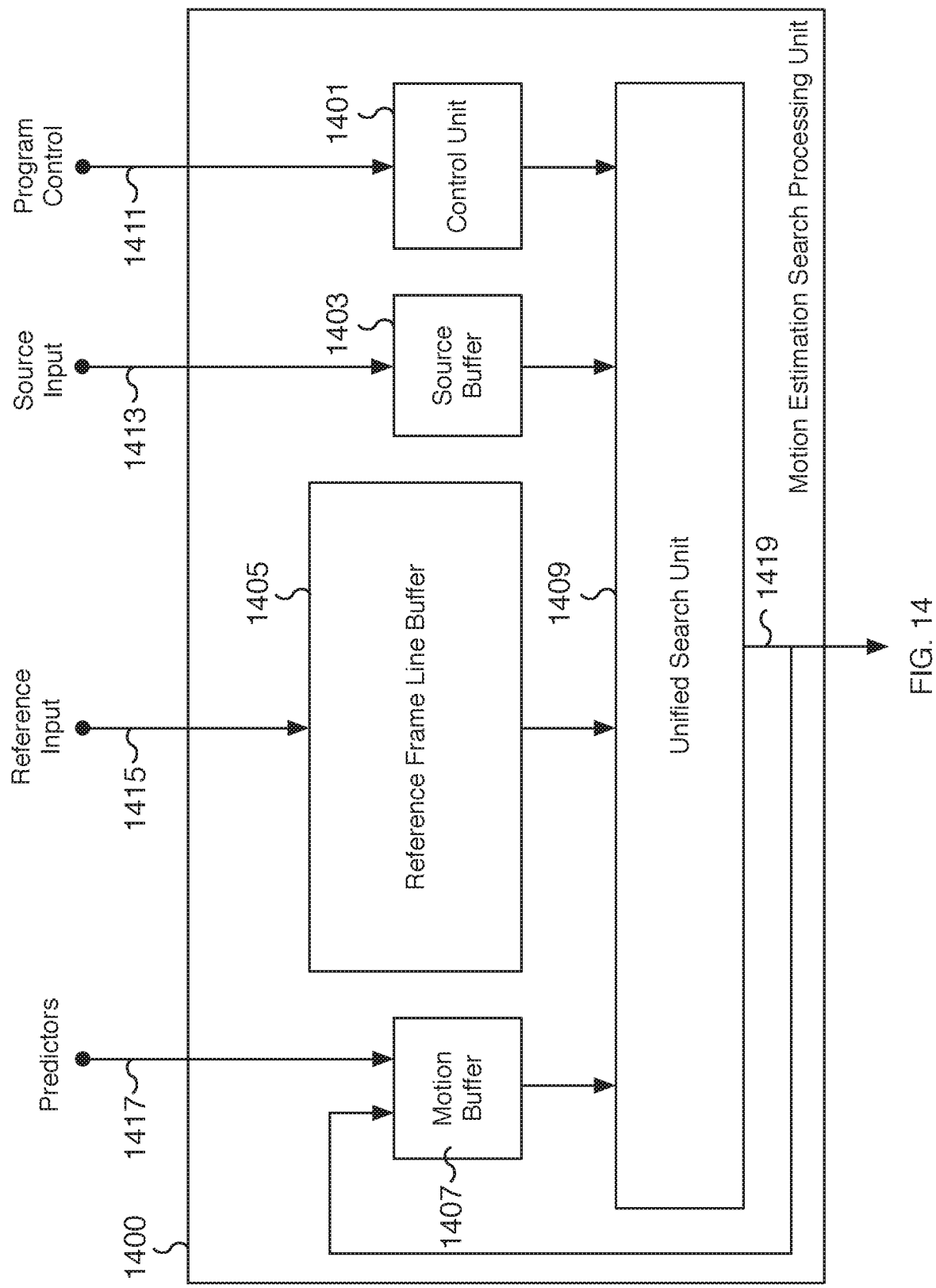
FIG. 14 is a block diagram illustrating an embodiment of a motion estimation search processing unit for performing hierarchical motion search.

In some embodiments, the video is encoded using a unified search unit such as unified search unit 1409 of FIG. 14. The encoding system can utilize a unified search window as described herein for significant performance improvements in particular when encoding to multiple target formats. Utilizing a unified search window allows the same motion estimation search processing unit to target multiple encoding formats while retaining high quality output and high performance. For example, a variety of encoding formats optimized for a variety of target devices such as mobile devices, televisions, desktop computers, laptops, and tablets, among others, can be supported.

Figure 2:
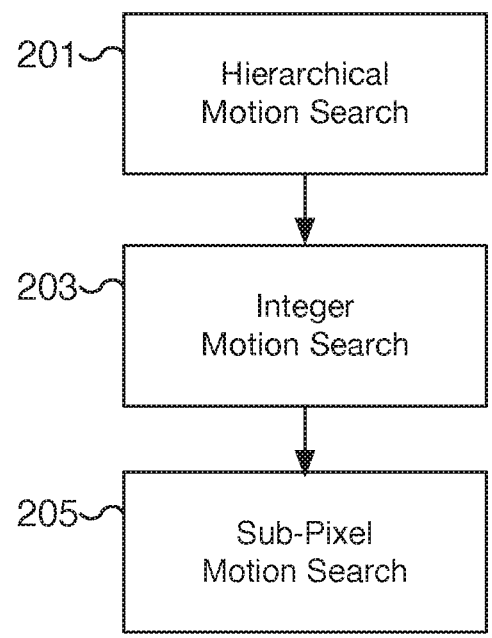
FIG. 2 is a flow chart illustrating an embodiment of a process for performing a motion estimation search.

FIG. 2 is a flow chart illustrating an embodiment of a process for performing a motion estimation search. The process of FIG. 2 may be performed as part of a video encoding step for converting video to an encoding format. In some embodiments, the motion estimation search includes multiple refinement steps starting with a hierarchical motion estimation search. The results from the hierarchical motion estimation search may be used to perform an integer pixel search and then a sub-pixel search. In some embodiments, additional (or fewer) motion search steps may be performed, as appropriate. By utilizing multiple steps, however, the total computational requirements are reduced and the performance is significantly increased. In particular, in some embodiments, one or more instances of motion estimation search processing unit 1400 of FIG. 14 are used for performing hierarchical motion search operations. In some embodiments, the use of motion estimation search processing unit 1400 of FIG. 14 allows multiple different encoding formats to be supported by the same hardware unit. In some embodiments, the process of FIG. 2 is performed at 107 of FIG. 1.

At 201, a hierarchical motion search is performed. In various embodiments, using one or more different resolution versions of the source video, a hierarchical motion search is performed. In some embodiments, high quality down-sampled versions are utilized for the hierarchical motion search. For example, a down-sampled or down-scaled version of the video from step 103 of FIG. 1 is utilized as input to a hierarchical motion search. The high quality down-sampled video retains high image quality despite being a lower resolution. In performing step 201, a low resolution version of the video is searched to identify motion estimate candidates. Next a higher resolution version is searched using the motion estimate candidates from the previous search performed on the lower resolution version of the video. Successive searches can be performed using higher resolution versions with results from the previous search to help refine the motion search results. For example, an initial search can be performed on the source video down-sampled along each dimension by 1/16. A subsequent search can be performed on the source video down-sampled along each dimension by 1/4 using motion predictors from the 1/16 search. In some embodiments, a full resolution search is performed as the final step for the hierarchical motion search. By starting with lower resolution initial searches, data bandwidth, processor, and other resources are reduced with minimal impact on search results. In some embodiments, the output of step 201 includes candidate motion vectors. In some embodiments, the candidate motion vectors are outputted as motion estimate search results 1419 of FIG. 14.

At 203, an integer motion search is performed. Using the motion estimation search results from 201, an integer pixel motion search is performed to refine the motion search results. For example, multiple reference frames can be searched using integer pixel resolution to refine motion search results. The results of integer refinement can be utilized for a sub-pixel motion search.

At 205, a sub-pixel motion search is performed. Using the integer motion estimation search results from 203, one or more sub-pixel motion searches are performed to further refine the motion search results. For example, multiple reference frames can be searched using ½, ¼, ⅛, or another sub-pixel resolution to refine motion search results. The results of sub-pixel refinement can be utilized for subsequent steps of video encoding.

Figure 3:
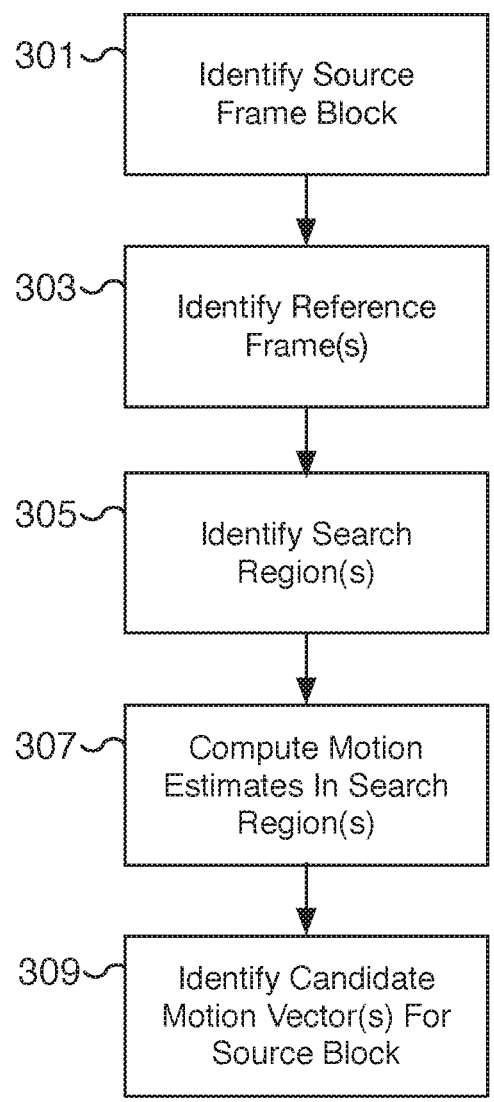
FIG. 3 is a flow chart illustrating an embodiment of a process for performing a motion estimation search.

FIG. 3 is a flow chart illustrating an embodiment of a process for performing a motion estimation search. The process of FIG. 3 is performed in part to identify the best motion estimation results and corresponding motion vectors for a source frame block by searching one or more multiple reference frames. A source frame is selected and a portion of the source frame, a source block, is used for the motion search against reference frames. For each reference frame, one or more search regions of the reference frame are identified and used to compute motion estimates. In various embodiments, the reference frames can be processed at least in part in parallel, for example, by different motion estimation search processing units. The motion vectors corresponding to the motion estimates that most closely match the source block are selected as the best candidate motion vectors. In some embodiments, the process of FIG. 3 is performed using a unified search window to support a variety of encoding formats. For example, the use of motion estimation search processing unit 1400 of FIG. 14 allows multiple different encoding formats to be supported by the same hardware unit. The motion estimation and identified motion vectors may be utilized as part of a hierarchical motion search. For example, one or more instances of motion estimation search processing unit 1400 of FIG. 14 are used for performing hierarchical motion search operations. In some embodiments, the process of FIG. 3 is performed using motion estimation search processing unit 1400 of FIG. 14 and, in particular, using unified search unit 1409 of FIG. 14.

At 301, a source frame block is identified. For example, the identified source frame block is a source block of a source frame of the video to be encoded. The source frame block can correspond to a portion of the source frame, such as a 16×16 pixel block. The source frame block may be sized so that it can be sub-divided into smaller unit blocks for computing motion estimates for different partition sizes. For example, a 16×16 pixel block can be sub-divided into 4×4 unit blocks for computing motion estimates corresponding to 4×4, 4×8, 8×4, 8×8, 8×16, 16×8, and/or 16×16 blocks. In some embodiments, the source block is identified after receiving the source block from a source buffer of a motion estimation search system. In various embodiments, different sized source frame blocks may be appropriate and may be dependent on the target encoding format. In some embodiments, the source block can be configurable. For example, the size of the source block can be configured to be optimized for the source and target formats. In some embodiments, the identified source frame block is received at a unified search unit such as unified search unit 1409 of FIG.

14. In some embodiments, the identified source frame block is received from a source buffer such as source buffer 1403 of FIG. 14.

At 303, one or more reference frames are identified. For example, a reference frame is identified for performing a motion search using the source frame block identified at 301. In some embodiments, multiple reference frames are identified and searched using the same source block. The frames may be searched at least in part concurrently. For example, multiple motion estimation search processing units each identify and search a different reference frame in parallel. Portions of the identified reference frame may be incrementally received at a motion estimation search processing unit and regions searched to identify motion vectors. In some embodiments, an identified reference frame is received at a motion estimation search processing unit such as motion estimation search processing unit 1400 of FIG. 14. In some embodiments, the reference frame or portions of the reference frame are stored in a reference frame line buffer such as reference frame line buffer 1405 of FIG. 14.

In some embodiments, as part of the process of identifying reference frames, optional motion predictors may be received for each reference frame. For example, motion predicators and a corresponding search range can be used to identify within a reference frame a starting location to initiate the motion search. In some embodiments, the motion predictors are motion vectors or a location corresponding to the reference frame. Motion predictors may be the result of a previous motion search, if available, such as a search using a lower resolution source frame block and reference frame or search region of the reference frame. Motion predictors may be zero motion vectors. In some embodiments, any motion predictors may be stored in a motion buffer such as motion buffer 1407 of FIG. 14 prior to being received at a unified search unit such as unified search unit 1409 of FIG. 14.

At 305, one or more search regions are identified. For example, for each reference frame, one or more search regions are identified. In some embodiments, the search regions are identified based on motion predictors received at 303. An identified search region corresponds to a portion of the reference frame that will be used to compute one or more motion estimations. In various embodiments, a search region is larger than the identified source frame block. For example, for utilizing a 16×16 pixel source frame block, a search region may be a 20×32 pixel block of a reference frame.

At 307, motion estimates are computed for the identified search regions. Using the identified source frame block at 301 and the identified search region(s) at 305, motion estimates are computed for each search region. For example, each motion estimation search processing unit computes one or more motion estimates for a search region of a reference frame using a source frame block. A motion estimate evaluates the difference between a searched portion of the search region with the source frame block. In some embodiments, a sum of absolute differences operation is performed between a searched portion of the search region with the source frame block. For example, each pixel of the source frame block is compared with a corresponding pixel of the searched portion of the search region. In some embodiments, the search region is larger than the source block and multiple reference blocks or portions of the search region are evaluated for motion estimates. In various embodiments, each search region is evaluated by a unified search unit of a motion estimation search processing unit and multiple search regions of different reference frames are searched in parallel. In some embodiments, at 307, all portions of the search region of the reference frame are searched and evaluated for motion estimates. In various embodiments, motion estimates are computed for a search region using a source block by a unified search unit such as unified search unit 1409 of FIG. 14 of a motion estimate search processing unit such as motion estimation search processing unit 1400 of FIG. 14.

At 309, candidate motion vectors for the source frame block are identified. For example, the best candidate motion vectors are identified by comparing the motion estimates computed at 307. In some embodiments, one or more best candidate motion vectors are identified. The motion vectors correspond to the locations in portions of the corresponding reference frames that are most similar to the source frame. In various embodiments, these locations are the best candidates for compression by removing temporal redundancy. In some embodiments, the candidate motion vectors will be motion predictors used to initiate motion searches on additional passes of the source frame with reference frames. For example, higher resolution versions of the source and reference frames may start their searches using the candidate motion vector results. In some embodiments, the candidate motion vectors are outputted as motion estimate search results 1419 of FIG. 14.

Figure 4:
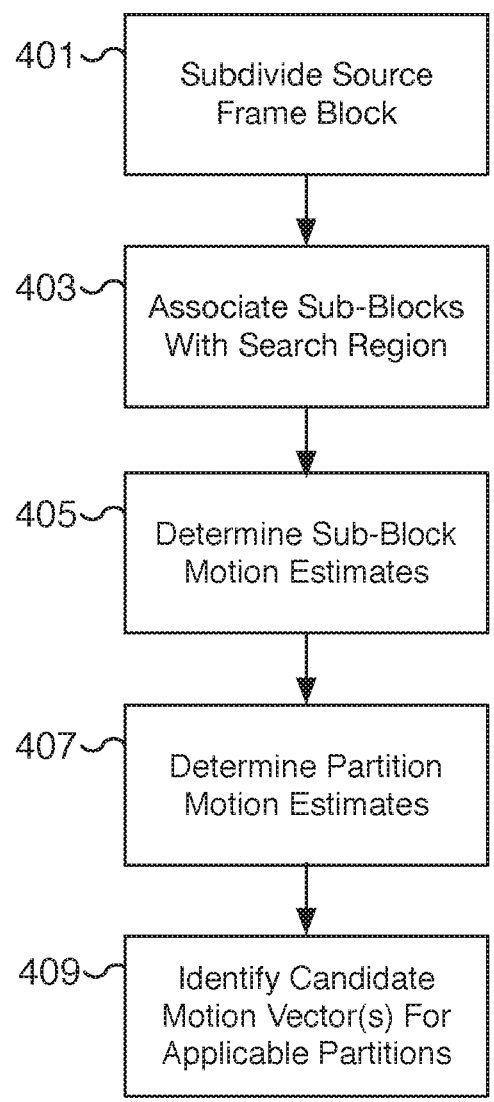
FIG. 4 is a flow chart illustrating an embodiment of a process for performing a portion of a unified motion estimation search.

FIG. 4 is a flow chart illustrating an embodiment of a process for performing a portion of a unified motion estimation search. In some embodiments, the process of FIG. 4 identifies the best motion estimate results and corresponding motion vectors for a source frame block when compared to a search region of a reference frame. By repeatedly applying the process of FIG. 4, all search regions of a reference frame can be searched. Once a source frame, reference frame, and corresponding search region are identified, the source frame block is compared to portions of the search region using sub-block units. The motion estimates computed using the sub-block units are combined to determine motion estimates for one or more different partition sizes. For example, multiple sub-block motion estimates can be added together to determine a motion estimate for a larger partition made up of multiple sub-block sized units. Support for different partition sizes with minimal additional processing allows the process of FIG. 4 to efficiently support requirements for a variety of encoding formats as part of a process for performing a unified motion estimation search on a search region. In some embodiments, the process of FIG. 4 is performed at 307 and/or 309 of FIG. 3. In some embodiments, the process of FIG. 4 is performed using motion estimation search processing unit 1400 of FIG. 14 and, in particular, using unified search unit 1409 of FIG. 14.

At 401, a source frame block is subdivided. For example, a source block is sub-divided into smaller sub-block units. In some embodiments, the source frame block is a 16×16 pixel block and is sub-divided into 16 non-overlapping sub-block units, each a 4×4 pixel sub-block. The sub-block unit size determines the supported partition sizes. For example, motion estimates corresponding to one or more 4×4 sub-block units can be utilized to determine motion estimates corresponding to partitions for 4×4, 4×8, 8×4, 8×8, 8×16, 16×8, and/or 16×16 blocks. In various embodiments, different sized source frame blocks and sub-blocks may be appropriate and may depend on the target encoding formats.

At 403, sub-blocks of the source frame block are associated with the search region. For example, portions of the search region of a reference frame are identified and associated with the source frame block and corresponding sub-blocks. In some embodiments, the search region of the reference frame is larger than the source frame block and multiple portions of the search region, with some portions potentially overlapping, are associated with the source frame block and corresponding sub-blocks. The identified portions of the search region are reference blocks. In some embodiments, each reference block matches the size of the source block. For example, a source block that is a 16×16 pixel block with 4×4 sub-blocks may be associated with one or more 16×16 pixel reference blocks of a 20×32 search region. In the example, the 20×32 search region includes 85 possible 16×16 pixel reference blocks that can be associated with the 16×16 search block to determine motion estimates. Each of the reference blocks start and end at different horizontal and vertical pixel locations. There are 17 different horizontal starting locations and 5 different vertical starting locations. In some embodiments, the last row and column starting locations are searched as part of the next search region resulting in 64 possible 16×16 pixel reference blocks to associate with a 16×16 search block. The 64 possible reference blocks have 16 different horizontal starting locations and 4 different vertical starting locations. In some embodiments, the search region is the same size as the search block and the reference block is the entire search region. In various embodiments, the sub-blocks of the source frame are associated with corresponding sub-blocks of each reference block. For example, a 16×16 pixel reference block has 16 corresponding 4×4 sub-blocks.

At 405, sub-block motion estimates are determined. For example, a motion estimate result is determined for each sub-block associated with the search region at 403. In some embodiments, for each reference block, a sub-block of the source frame is compared with the corresponding sub-block of the reference frame search region to compute motion estimate results at a sub-block unit of granularity. For example, a 16×16 source block with 4×4 sub-blocks has 16 sub-blocks. For each reference block, there are 16 corresponding sub-blocks and a motion estimation is determined for each of the 16 sub-block comparisons. Each motion estimation evaluates the difference between a sub-block of the source block with the corresponding sub-block of a reference block. In some embodiments, a sum of absolute differences operation is performed. For example, for each source sub-block, each pixel is compared with a corresponding pixel of the searched reference sub-block. In various embodiments, each search region is evaluated by a unified search unit of a motion estimation search processing unit and multiple search regions of different reference frames may be searched in parallel by different motion estimation search processing units. In some embodiments, at 405, all reference blocks of the search region of the reference frame are searched and evaluated for motion estimates at a sub-block unit of granularity.

At 407, partition motion estimates are determined. For example, one or more partition motion estimates are determined by combining one or more sub-block motion estimates determined at 405. Using 4×4 sub-block units as an example, two 4×4 sub-block motion estimates are combined to compute the motion estimate for the corresponding 4×8 or 8×4 pixel block. Similarly, four 4×4 sub-block motion estimates are combined to compute the motion estimate for the corresponding 8×8 pixel block and eight 4×4 sub-block motion estimates are combined to compute the motion estimate for the corresponding 8×16 or 16×8 pixel block. To compute the motion estimate for a 16×16 pixel block, all 16 sub-blocks are combined. Each 4×4 sub-block alone corresponds to a 4×4 partition configuration. Other partition configurations using 4×4 sub-blocks are possible and may be appropriate as required. Although 16×16 pixel blocks and 4×4 sub-blocks are used as examples, alternative sized configurations may be utilized as appropriate and different configurations may be selected depending on the output encoding format. For example, 8×8 sub-blocks may be appropriate for some encoding formats. In various embodiments, the sub-block and source block sizes are selected based on the compatibility of the configuration with the requirements of the desired encoding formats.

In some embodiments, the steps 403, 405, and/or 407 are not performed in strict order. For example, in some scenarios, multiple reference blocks of a search region are searched. One or more of steps 403, 405, and/or 407 are performed for a single reference block of the search region before the steps are applied again for the next applicable reference block of the search region. For example, step 403 is first performed on a first reference block of a search region to associate the source frame sub-blocks with the first reference block. Next, step 405 is performed to determine motion estimates for each source frame sub-block against corresponding sub-blocks of the first reference block. Step 407 may then be applied to determine a motion estimate of one or more partition configurations using the sub-block motion estimate results. The sequence of steps 403, 405, and/or 407 are then repeated for the next reference block of the search region. In various embodiments, the sequence of steps 403, 405, and/or 407 repeats for each application reference block until a motion estimation search is performed on all applicable reference blocks of the search region.

At 409, candidate motion vectors for applicable partitions are identified. Using the motion estimates determined at 405 and/or 407, candidate motion vectors corresponding to each applicable partition configuration are determined and identified. For example, the best candidate motion vectors are identified for each applicable partition configuration by comparing the corresponding computed partition motion estimates of the different searched reference blocks of the search region. In some embodiments, one or more best candidate motion vectors are identified. The motion vectors correspond to the locations in the portions of the search region that are most similar to the source frame based on the applicable partition configuration. In various embodiments, the process of FIG. 4 identifies motion vector candidates for multiple partition configurations by utilizing a unified search window. When the process of FIG. 4 is applied to all applicable search regions of a reference frame, the motion vectors can be utilized to identify the best candidate locations for compression by removing temporal redundancy.

Figure 5:
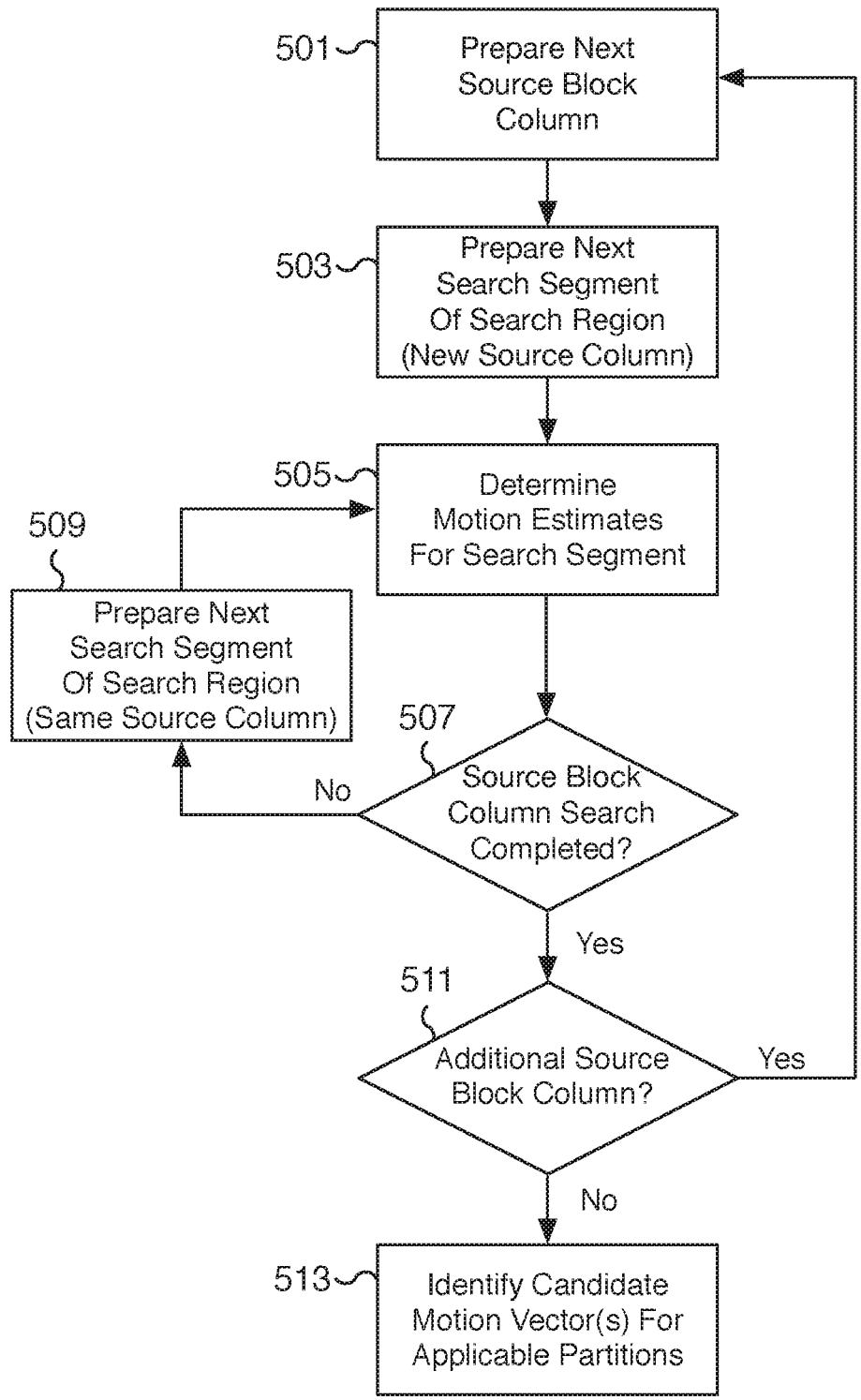
FIG. 5 is a flow chart illustrating an embodiment of a process for performing a portion of a unified motion estimation search.

FIG. 5 is a flow chart illustrating an embodiment of a process for performing a portion of a unified motion estimation search. In some embodiments, the process of FIG. 5 identifies the best motion estimate results and corresponding motion vectors for a source frame block when compared to a search region of a reference frame. The process of FIG. 5 performs motion estimates for sub-blocks by analyzing the sub-blocks of the source frame in a column group against corresponding sub-blocks of the search region. The corresponding sub-blocks of the reference blocks can overlap and together form a search segment of the search region. In some embodiments, the process of FIG. 5 is performed at 403, 405, 407, and/or 409 of FIG. 4. In some embodiments, the process of FIG. 5 is performed using motion estimation search processing unit 1400 of FIG. 14 and, in particular, using unified search unit 1409 of FIG. 14.

At 501, the next source block column is prepared. For example, a column of sub-blocks of a source frame block is identified and prepared for evaluation. In some embodiments, the sub-block columns of the source block are processed from left to right. For example, the first source block column prepared is the leftmost column of sub-blocks of the source block. On the next iteration through step 501, the second column from the left is prepared. The third column from the left is prepared for the third iteration, and so forth, until all columns are prepared. For a 16×16 pixel source block with 4×4 sub-blocks, each source block column includes four 4×4 sub-blocks stacked vertically. Four iterations through step 501 are required to process the entire 16×16 source block with 4×4 sub-blocks. Although the set of sub-blocks described with respect to FIG. 5 is based on column groups, alternative groupings, such as partial columns of sub-blocks, rows of sub-blocks, or multiple columns of sub-blocks, etc. may be appropriate as well.

At 503, the next search segment of the search region is prepared for a new source block column. For example, a new search segment is prepared for the new source block column prepared at 501. In some embodiments, the search segment is a subset of the search region. The search segment may be larger both vertically and horizontally than the source block column. For example, for a 20×32 pixel block search region with a corresponding 16×16 pixel source block, an 8×24 pixel search segment can be prepared. In this example, the source block column is made up of four sub-blocks whereas the search segment is the size of twelve sub-blocks, two sub-blocks wide and six sub-blocks tall. In various embodiments, the search segment includes at least as many sub-blocks as the source block column and may include many more sub-blocks as appropriate.

In some embodiments, the next search segment for a new source block column is processed from left to right of the search region and increments by a sub-block width for each pass through step 503. For example, the first search segment prepared starts at the left edge of the search region. On the next iteration through step 503, the search segment prepared is offset from the left edge of the search region by one sub-block. For the third iteration through step 503, the search segment prepared is offset from the left edge of the search region by two sub-blocks, and so forth, until all corresponding portions of the search region have been made prepared for the corresponding source block column.

At 505, motion estimates are determined for the prepared search segment. For example, the source block column prepared at 501 is compared with a search segment prepared at 503 or 509. In some embodiments, a sum of absolute differences operation is performed for each sub-block of the source block column against a corresponding sub-block of the search segment. In some embodiments, the search segment is larger than the source block column. The source block column is compared against different portions of the search segment starting at different offsets (both vertically and horizontally) until all relevant portions of the search segment are searched. Motion estimates are determined for each sub-block of the source block column against the possible sub-blocks of the search segment. For example, for a 4×16 pixel source block column and 8×24 pixel search segment, different 4×8 portions of the 8×24 pixel search segment are analyzed for motion estimates at a sub-block level of granularity. In some embodiments, the different portions of the search segment are analyzed concurrently. The motion estimates may be determined in a single cycle or across multiple cycles. For a 4×16 pixel source block column with 4×4 sub-blocks, motion estimates for the 8×24 pixel search segment can be determined using 128 sum of absolute differences operations by comparing each 4×4 sub-block against corresponding sub-blocks of the prepared search segment.

At 507, a determination is made whether the source block column search for the search region has been completed. In the event the search block column search is not complete, processing proceeds to 509. For example, additional portions of the search region exist that have not yet been searched for using the source block column. In the event the source block column search is complete, processing proceeds to 511.

At 509, the next search segment of the search region is prepared for the existing source block column. In various embodiments, the search region corresponding to a source block column spans two or more search segments that are separately searched. At 509, a search segment from the search region that has not been searched for using the corresponding sub-blocks of the source block column is prepared. In some embodiments, the new search segment is the bottom search segment of the search region. For example, in some embodiments, a search region of a source block column spans a top search segment corresponding to the top sub-blocks of the search region and a bottom search segment corresponding to the bottom sub-blocks of the search region. The top and bottom search segments may overlap. For example, an 8×32 pixel portion of the search region may include an 8×24 top search segment and an 8×24 bottom search segment. The top and bottom search segments overlap by 8×16 pixels, the bottom 8×16 pixels of the top search segment overlapping with the top 8×16 pixels of the bottom search segment. In some embodiments, a first pass through 505 searches the top search segment prepared at 503 and a second pass through 505 searches the bottom search segment prepared at 509.

At 511, a determination is made whether an additional source block column of the source block remains for searching. In the event an additional source block column remains for searching, processing proceeds back to 501. In the event no additional source block columns remain for searching, processing proceeds to 513.

At 513, candidate motion vectors for applicable partitions are identified. Using the motion estimates determined at 505, candidate motion vectors corresponding to each applicable partition configuration are determined and identified. For example, the best candidate motion vectors are identified for each applicable partition configuration by computing partition motion estimates based on the different searched sub-blocks and their corresponding motion estimates. In some embodiments, one or more best candidate motion vectors are identified.

Figure 6:
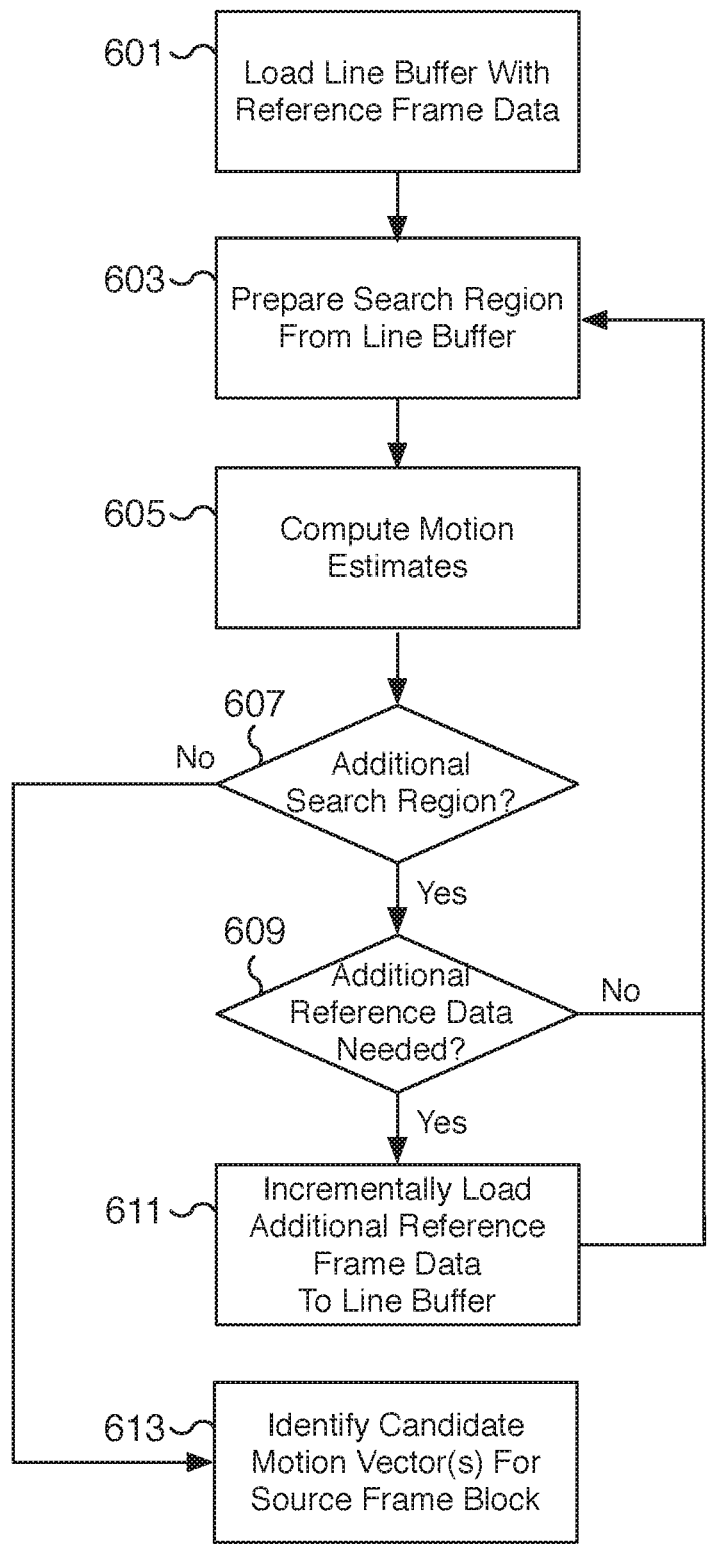
FIG. 6 is a flow chart illustrating an embodiment of a process for performing hierarchical motion search using a reference frame line buffer.

FIG. 6 is a flow chart illustrating an embodiment of a process for performing hierarchical motion search using a reference frame line buffer. The process of FIG. 6 is performed in part to identify the best motion estimation results and corresponding motion vectors for a source frame block by searching a reference frame. The searched reference frame is loaded into a reference frame line buffer of a motion estimation search processing unit and compared with a provided source frame block. By utilizing the reference frame line buffer, each reference frame is loaded from memory only once for a source block motion search. In some embodiments, the process of FIG. 6 is performed at 201 of FIG. 2 and in conjunction with the processes of FIGS. 3, 4, and/or 5. For example, the process of FIG. 6 describes how source and reference data is efficiently loaded, prepared, and compared to determine motion vectors. In some embodiments, the process of FIG. 6 is performed by one or more instances of motion estimation search processing unit 1400 of FIG. 4. In some embodiments, the reference frame line buffer utilized by the process of FIG. 6 is reference frame line buffer 1405 of FIG. 14.

At 601, a reference frame line buffer is loaded with reference frame data. For example, data corresponding to a reference frame is loaded into the line buffer. In some embodiments, the data is only a subset of the reference frame and additional data from the reference frame is loaded as appropriate. In various embodiments, the line buffer supports (and requires) loading each row of the reference frame in its entirety. For example, reference data is not loaded as partial rows but only as entire (or complete) rows. The rows may be loaded from the top to the bottom of the reference frame allowing the motion search to proceed from top to bottom. In various embodiments, the reference frame line buffer may be configurable for different row lengths. For example, a video and corresponding frames down-sampled by a factor of 16 require a different row length than a video and corresponding frames down-sampled by a factor of 4. In various embodiments, the different levels of the hierarchical search (using different resolutions of the source video) require different row lengths for the expected frames and the reference frame line buffer can be configured, for example, to adjust the row length based on the expected frame size.

At 603, a search region of the reference frame is prepared from the reference frame line buffer. For example, a portion of the reference data stored in the reference frame line buffer is prepared as a search region. In some embodiments, the search region is a subset of the reference frame and different search regions may overlap as the motion search progresses through the reference frame. In some embodiments, the search region advances from left to right of the reference frame along the entire row of the reference frame. In some embodiments, the size of the search region can be configurable. In some embodiments, the search region is the search region(s) of FIGS. 3, 4, and/or 5. For example, the search region can be the search region identified at 305 of FIG. 3, associated with source frame sub-blocks at 403 of FIG. 4, and/or searched using prepared search segments of the search region at 505 of FIG. 5.

In some embodiments, one or more local memory buffers may be utilized for aligning and preparing search regions. For example, a local line buffer may be used to prepare search regions by extracting the appropriate rows or subsets of appropriate rows from the reference frame line buffer. The local line buffer may be utilized to optimize memory operations for the motion search. For example, the local line buffer may be used to increase performance for different sized frames by minimizing the amount of data shuffling required in the reference frame line buffer. In some embodiments, a subset of the data in the reference frame line buffer is replicated in the local line buffer.

At 605, motion estimates are computed. For example, using the search region prepared at 603, motion estimates are computed by comparing the search region to a source block. In various embodiments, the motion estimates are determined using the sum of absolute differences or another appropriate measure. In some embodiments, the step of 605 is performed at and as described with respect to steps 307 of FIGS. 3, 405 and/or 407 of FIG. 4, and/or 505 of FIG. 5.

At 607, a determination is made whether an additional search region exists. In the event an additional search region exists, processing proceeds to 609 to determine whether additional reference frame data is needed for the additional search region. In the event no additional search region exists, processing proceeds to 613.

At 609, a determination is made whether additional reference frame data is needed. In the event additional reference frame data is needed, processing proceeds to 611 to load additional reference frame data. For example, the next search region includes data not loaded in the line buffer and new reference data must be retrieved to prepare the next search region. In the event no additional reference frame data is needed, processing loops back to 603 to prepare a new search region from the line buffer.

At 611, the reference frame line buffer is incrementally loaded with additional reference frame data. For example, additional rows of the reference frame are loaded into the reference frame line buffer. The additional rows replace rows that are no longer needed. For example, a reference frame row that is fully searched and/or the corresponding pixels that are no longer needed for the source block search are replaced with a new reference frame row. In various embodiments, only once a row is no longer needed is it replaced with a new row. As described with respect to step 601, incremental loads will load each new row of the reference frame in its entirety.

At 613, candidate motion vectors for a source frame block are identified. For example, the best candidate motion vectors are identified by comparing the motion estimates computed at 605. In some embodiments, the number of candidate motion vectors is configurable. For example, one, two, or more best candidate motion vectors can be identified. In some embodiments, the step of 613 is performed at and as described with respect to steps 309 of FIG. 3, 409 of FIG. 4, and/or 513 of FIG. 5.

Figure 7:
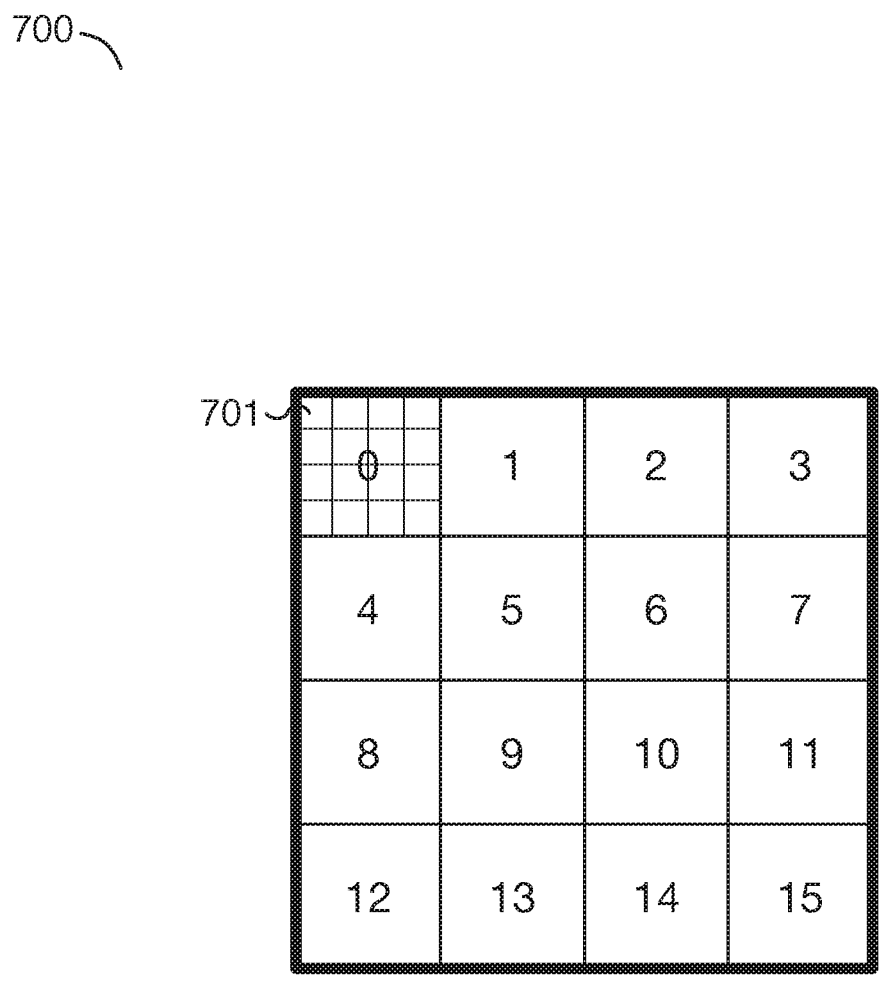

FIG. 7 is a diagram illustrating an embodiment of a source frame block for performing a motion estimation search. Source frame block 700 is an example of a source block used to search for redundancy in video reference data such as reference frames. In the example shown, source frame block 700 is a 16×16 pixel block and is sub-divided into sixteen sub-blocks, shown as numbered sub-blocks 0 through 15. Sub-block 701 is one example of a sub-block of source frame block 700 and is numbered sub-block zero. Sub-block 701 is a 4×4 pixel block where each location in the grid of sub-block 701 corresponds to a pixel. In various embodiments, source frame block 700 is a source block of a video to be encoded using at least in part one or more of the processes of FIGS. 1-6. Depending on the scenario, source frame block 700 may be a source block from a down-sampled version of the original video. In some embodiments, source frame block 700 depicts the sub-blocks of a source frame block as subdivided at step 401 of FIG. 4. Although source frame block 700 is shown as a 16×16 pixel block with 16 sub-blocks, other dimensions and sub-block divisions may be appropriate as well.

Figure 8:
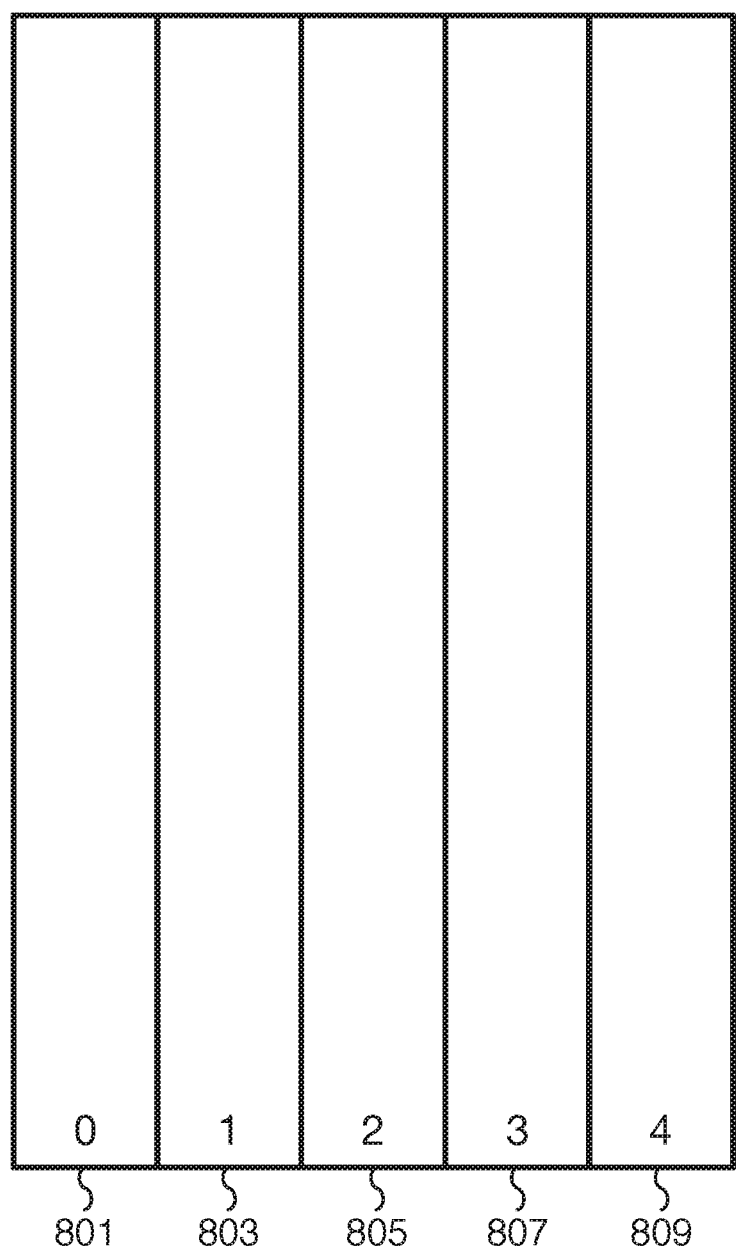
FIG. 8 is a diagram illustrating an embodiment of a search region for performing a motion estimation search.

FIG. 8 is a diagram illustrating an embodiment of a search region for performing a motion estimation search. In the example shown, search region 800 is a portion of a reference frame used for searching against a source frame block. Search region 800 includes columns 801, 803, 805, 807, and 809 shown as numbered columns 0 through 4. In some embodiments, search region 800 is a 20×32 pixel block of reference data and each of columns 801, 803, 805, 807, and 809 is 4 pixels wide and 32 pixels tall. Search region 800 may be searched against a 16×16 source frame block having 4×4 sub-blocks.

In various embodiments, search region 800 is the search region of a reference frame used by one or more of the processes of FIGS. 1-6. Depending on the scenario, search region 800 may be reference data from a down-sampled version of the original video. In some embodiments, columns 801, 803, 805, 807, and 809 of search region 800 depict the search segment boundaries for the search segments described with respect to FIG. 5. Although search region 800 is sometimes described as a 20×32 pixel block of reference data and having the width of five sub-blocks, other dimensions may be appropriate as well.

In some embodiments, a motion estimation search is performed on a reference frame by applying search region 800 to an entire search window of a reference frame. A search region is applied to different portions of the search window, incrementally searching the reference frame in search region portions with the appropriate portions of a source frame block. For example, once a search using search region 800 on one portion of a search window is complete, search region 800 increments from left to right and then top to bottom to search new portions of the search window. The increments are a fixed offset such as 4 pixels along the width of the search window and 16 pixels along the height of the search window. In some embodiments, the dimensions of the search window are based on a maximum width and height from a reference location. For certain search region offsets, the corresponding reference frame data of the search window may not completely align with search region 800. For example, along the edges of the reference frame, only a subset of search region 800 will overlap with the search window and have corresponding reference data. At these boundary conditions, the corresponding reference data may not align to a column edge of search region 800. For example, in some scenarios, the overlap between the right edge of a search window and search region 800 may only be 2 pixels wide. The search is performed using applicable portions of corresponding column 801 of search region 800 against the partial column of reference data from the search window. The columns 803, 805, 807, and 809 of search region 800 have no corresponding reference data and do not need searching. In various embodiments, similar boundary conditions can exist along multiple edges of the reference frame such as the bottom edge.

Figure 9:
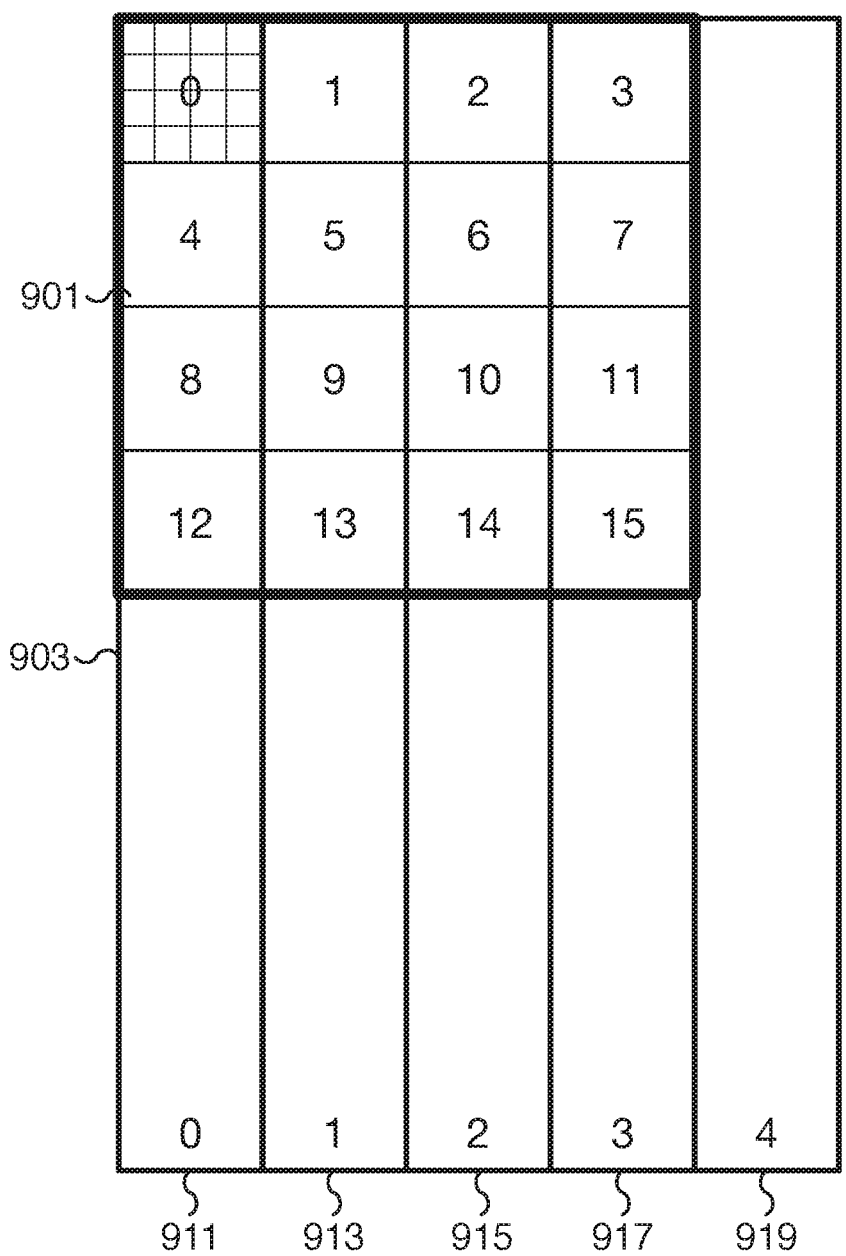
FIG. 9 is a diagram illustrating an embodiment of a source frame block and corresponding search region for performing a motion estimation search.

FIG. 9 is a diagram illustrating an embodiment of a source frame block and corresponding search region for performing a motion estimation search. In the example shown, source frame block 901 is overlaid on corresponding search region 903. Source frame block 901 is shown sub-divided into sixteen sub-blocks with sub-block zero representing the sub-division of source frame block 901 into 4×4 pixel sub-blocks. Source frame block 901 is an example of a source block used to search for redundancy in video reference data such as reference frames. FIG. 9 also depicts search region 903. Search region 903 includes columns 911, 913, 915, 917, and 919 shown as numbered columns 0 through 4. Search region 903 is a portion of a reference frame used for searching against source frame block 901. In some embodiments, search region 903 is a 20×32 pixel block of reference data and each of columns 911, 913, 915, 917, and 919 is 4 pixels wide and 32 pixels tall. In some embodiments, source frame block 901 is source frame block 700 of FIG. 7 and/or search region 903 is search region 800 of FIG. 8. Although source frame block 901 is shown as a 16×16 pixel block with 16 sub-blocks and search region 903 is described as a 20×32 pixel block of reference data and having the width of five sub-blocks, other dimensions may be appropriate as well.

In some embodiments, source frame block 901 and search region 903 are the source frame block and search region used by one or more of the processes of FIGS. 1-6. Source frame block 901 can be used to search against all relevant portions of search region 903 to identify redundancy by evaluating motion estimates at a sub-block level of granularity. In some embodiments, sub-blocks of a source frame, such as source frame block 901, are analyzed in a column group against corresponding sub-blocks of a search region, such as search region 903. The corresponding sub-blocks of the search region can overlap and together form a search segment of the search region. For example, a first source block column of source frame block 901 includes sub-blocks 0, 4, 8, and 12. A second source block column includes sub-blocks 1, 5, 9, and 13. A third source block column includes sub-blocks 2, 6, 10, and 14. And a fourth source block column includes sub-blocks 3, 7, 11, and 15. In some embodiments, each source block column is searched against two columns of search region 903 that form a search segment. For example, the first source block column is searched against the search segment corresponding to columns 911 and 913. The second source block column is searched against the search segment corresponding to columns 913 and 915. The third source block column is searched against the search segment corresponding to columns 915 and 917. And the fourth source block column is searched against the search segment corresponding to columns 917 and 919. In some embodiments, each sub-block of source frame block 901 is searched against portions of search region 903 to identify the best candidate locations for redundancy.

Figure 10:
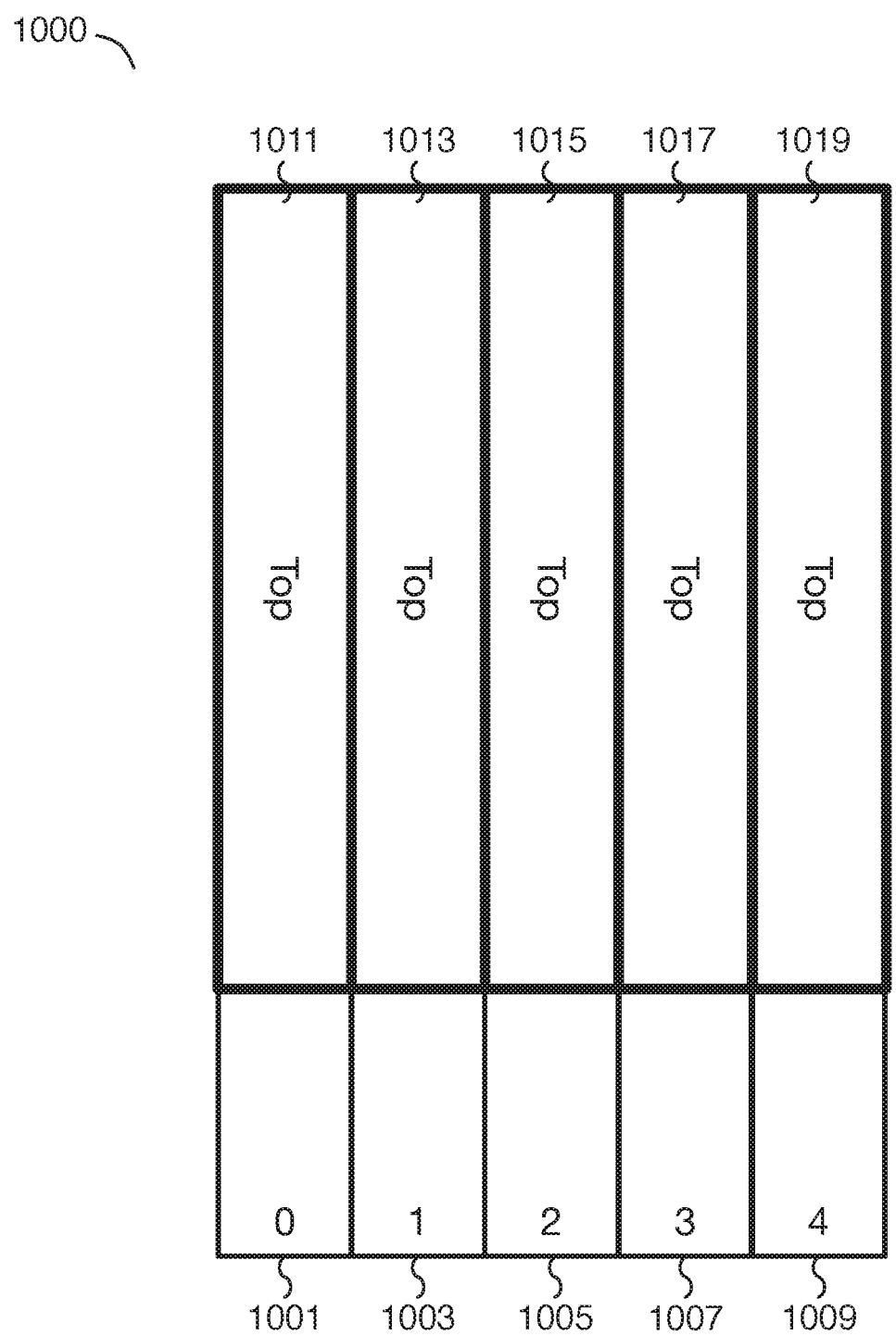
FIG. 10 is a diagram illustrating an embodiment of a search region and corresponding top search segments for performing a motion estimation search.

FIG. 10 is a diagram illustrating an embodiment of a search region and corresponding top search segments for performing a motion estimation search. In the example shown, search region 1000 is a portion of a reference frame used for searching against a source frame block. In some embodiments, search region 1000 is search region 800 of FIG. 8, search region 903 of FIG. 9, and/or search region 1100 of FIG. 11. Search region 1000 includes columns 1001, 1003, 1005, 1007, and 1009 shown as numbered columns 0 through 4. In some embodiments, search region 1000 is a 20×32 pixel block of reference data and each of columns 1001, 1003, 1005, 1007, and 1009 is 4 pixels wide and 32 pixels tall. Top portions of search region 1000 are depicted top partial search segments 1011, 1013, 1015, 1017, and 1019. In various embodiments, one or more top partial search segments 1011, 1013, 1015, 1017, and 1019 are combined into a search segment and searched using a source block column as described with respect to FIG. 5. For example, from left to right source block columns, top partial search segments 1011 and 1013 may be combined and searched using the first source block column of a source frame block, top partial search segments 1013 and 1015 may be combined and searched using the second source block column, top partial search segments 1015 and 1017 may be combined and searched using the third source block column, and top partial search segments 1017 and 1019 may be combined and searched using the fourth source block column. In some embodiments, the search segment prepared at 503 of FIG. 5 corresponds to a combination of top partial search segments 1011, 1013, 1015, 1017, and/or 1019 for the particular source block column.

Figure 11:
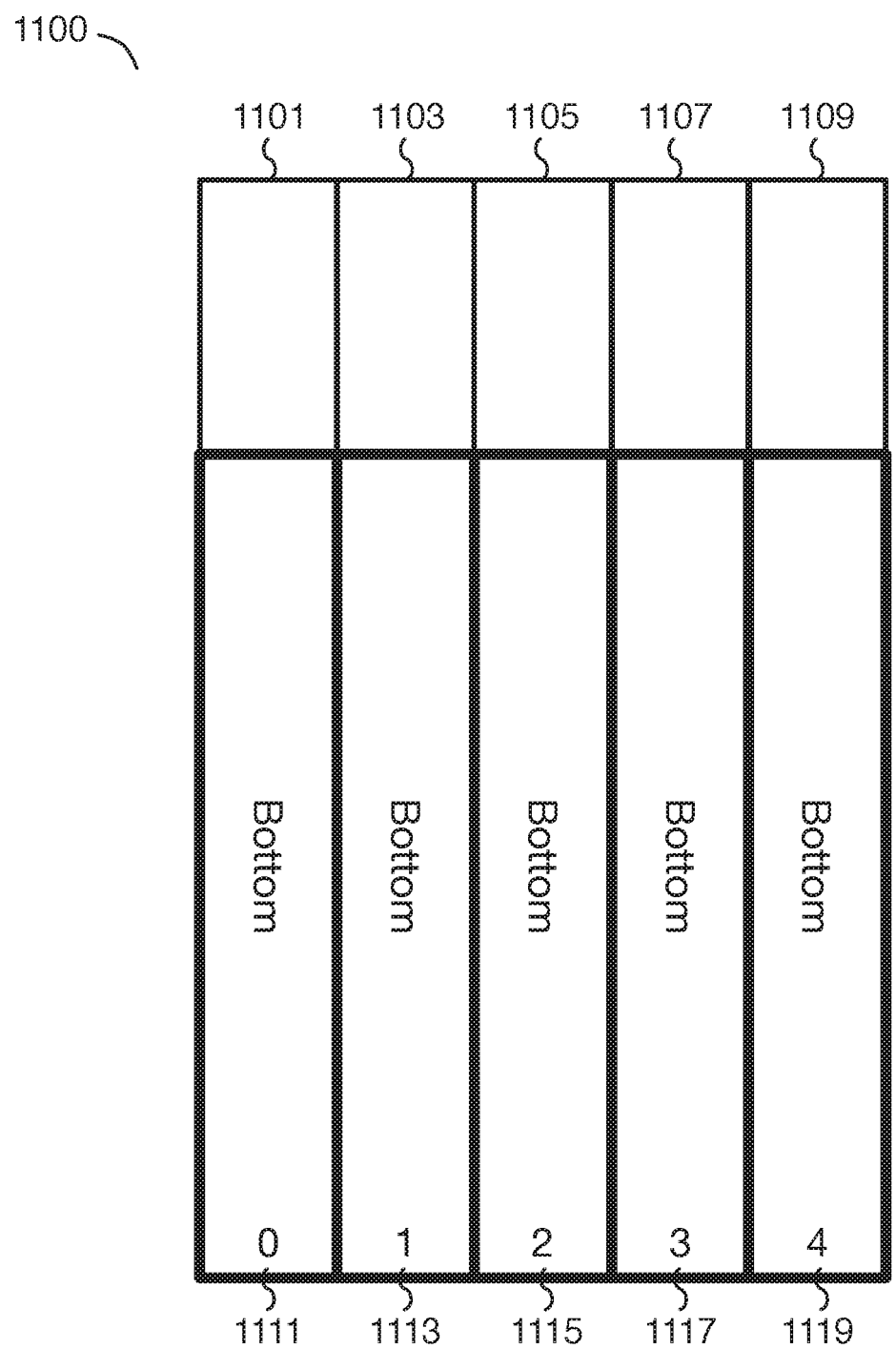
FIG. 11 is a diagram illustrating an embodiment of a search region and corresponding bottom search segments for performing a motion estimation search.

FIG. 11 is a diagram illustrating an embodiment of a search region and corresponding bottom search segments for performing a motion estimation search. In the example shown, search region 1100 is a portion of a reference frame used for searching against a source frame block. In some embodiments, search region 1100 is search region 800 of FIG. 8, search region 903 of FIG. 9, and/or search region 1000 of FIG. 10. Search region 1100 includes columns 1101, 1103, 1105, 1107, and 1109 shown as numbered columns 0 through 4. In some embodiments, search region 1100 is a 20×32 pixel block of reference data and each of columns 1101, 1103, 1105, 1107, and 1109 is 4 pixels wide and 32 pixels tall. Bottom portions of search region 1100 are depicted bottom partial search segments 1111, 1113, 1115, 1117, and 1119. In various embodiments, one or more bottom partial search segments 1111, 1113, 1115, 1117, and 1119 are combined into a search segment and searched using a source block column as described with respect to FIG. 5. For example, from left to right source block columns, bottom partial search segments 1111 and 1113 may be combined and searched using the first source block column of a source frame block, bottom partial search segments 1113 and 1115 may be combined and searched using the second source block column, bottom partial search segments 1115 and 1117 may be combined and searched using the third source block column, and bottom partial search segments 1117 and 1119 may be combined and searched using the fourth source block column. In some embodiments, the search segment prepared at 509 of FIG. 5 corresponds to a combination of bottom partial search segments 1111, 1113, 1115, 1117, and 1119 for the particular source block column.

In some embodiments, the combination of top partial search segments 1011, 1013, 1015, 1017, and/or 1019 of FIG. 10 and bottom partial search segments 1111, 1113, 1115, 1117, and 1119 of FIG. 11 allows a source frame block to complete a search of the corresponding search region represented by search region 1000 of FIG. 10 and search region 1100 of FIG. 11. As shown in FIGS. 10 and 11, a search region spans top search segments corresponding to the top sub-blocks of the search region and bottom search segments corresponding to the bottom sub-blocks of the search region. The top and bottom search segments may overlap. For example, an 8×32 pixel portion of the search region may include an 8×24 top search segment and an 8×24 bottom search segment. The top and bottom search segments overlap by 8×16 pixels, the bottom 8×16 pixels of the top search segment overlapping with the top 8×16 pixels of the bottom search segment.

Figure 12A:
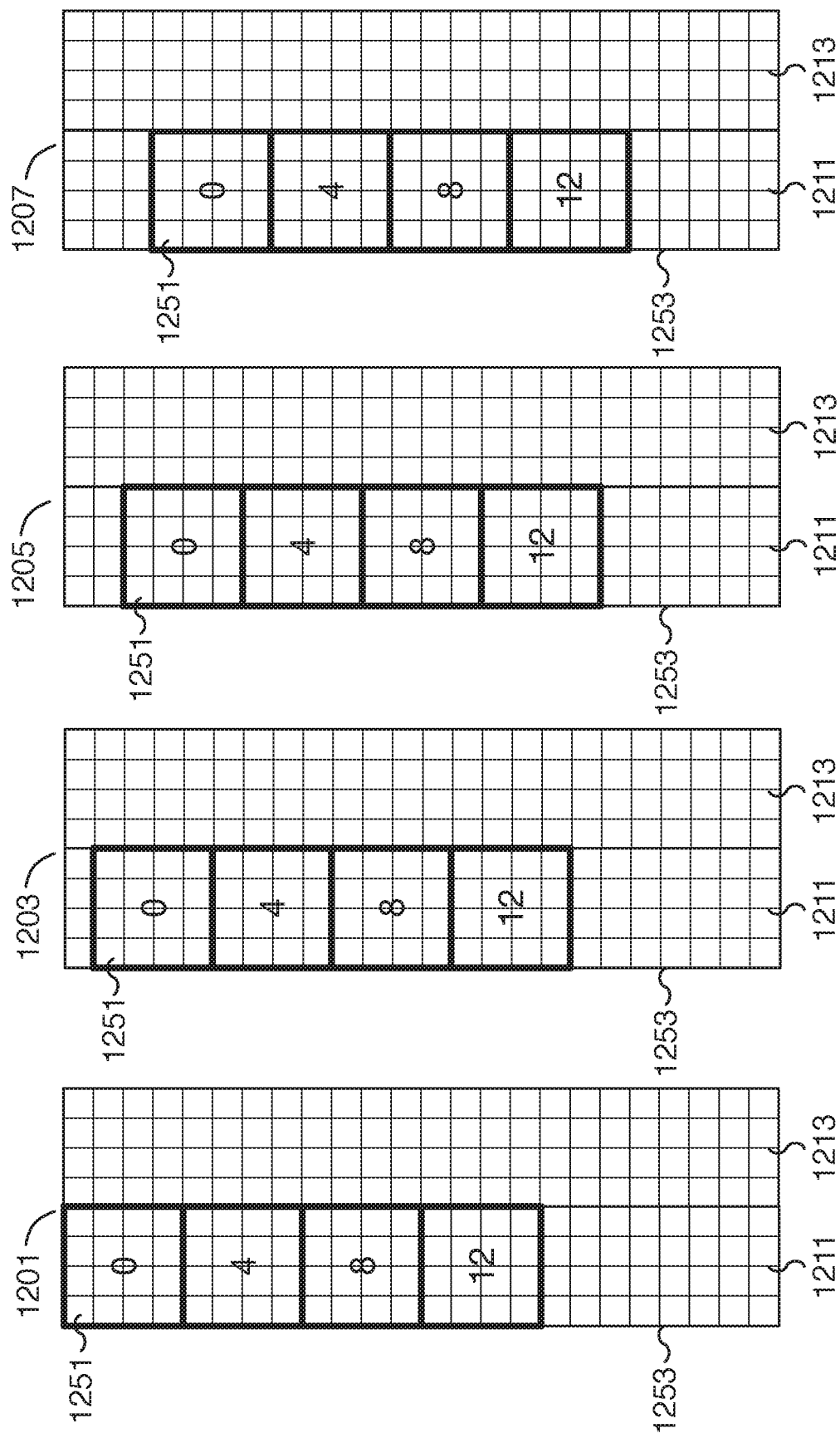
FIGS. 12A, 12B, and 12C are diagrams illustrating an embodiment of a search segment and corresponding source block column.
Figure 12B:
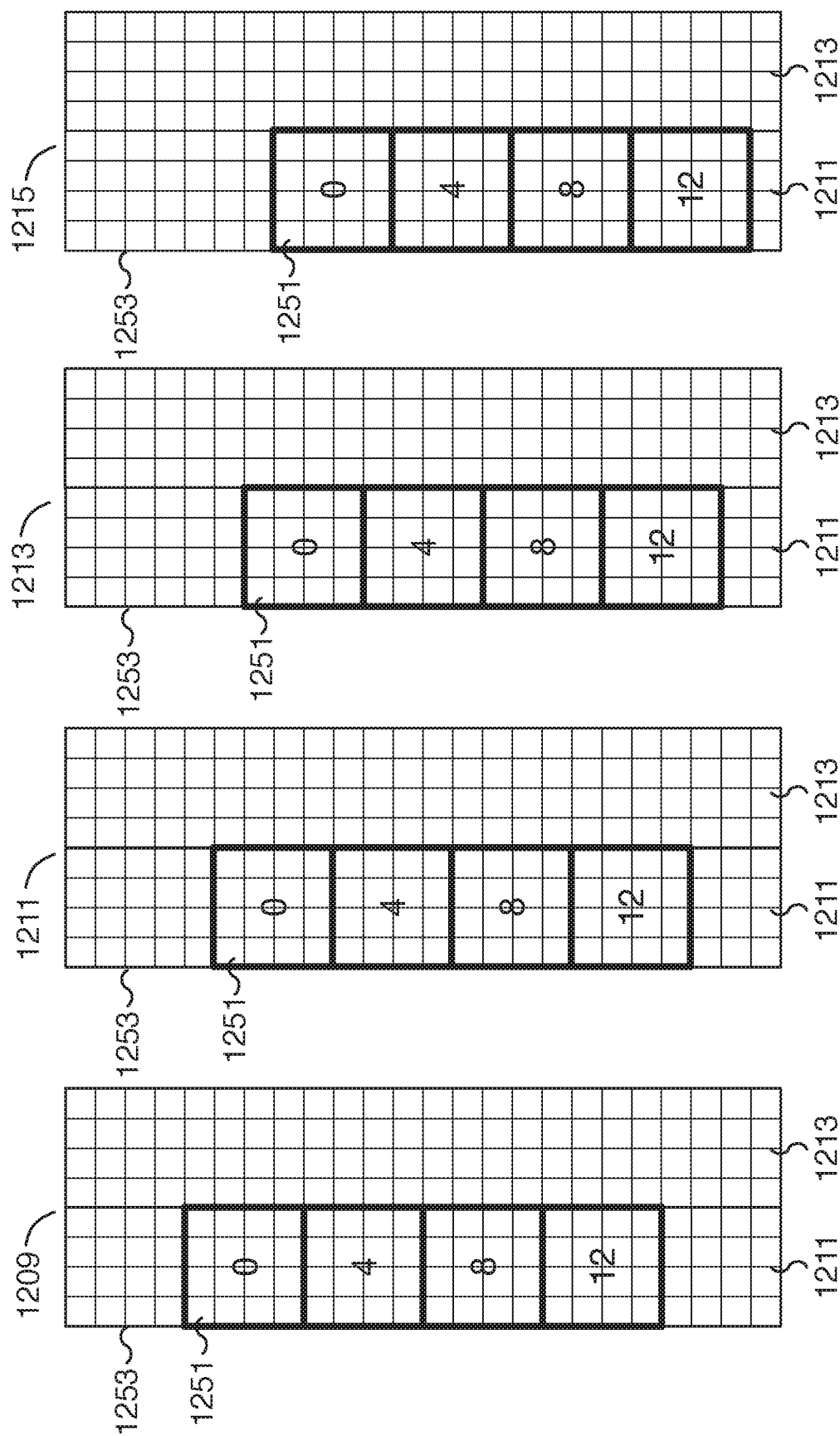
Figure 12C:
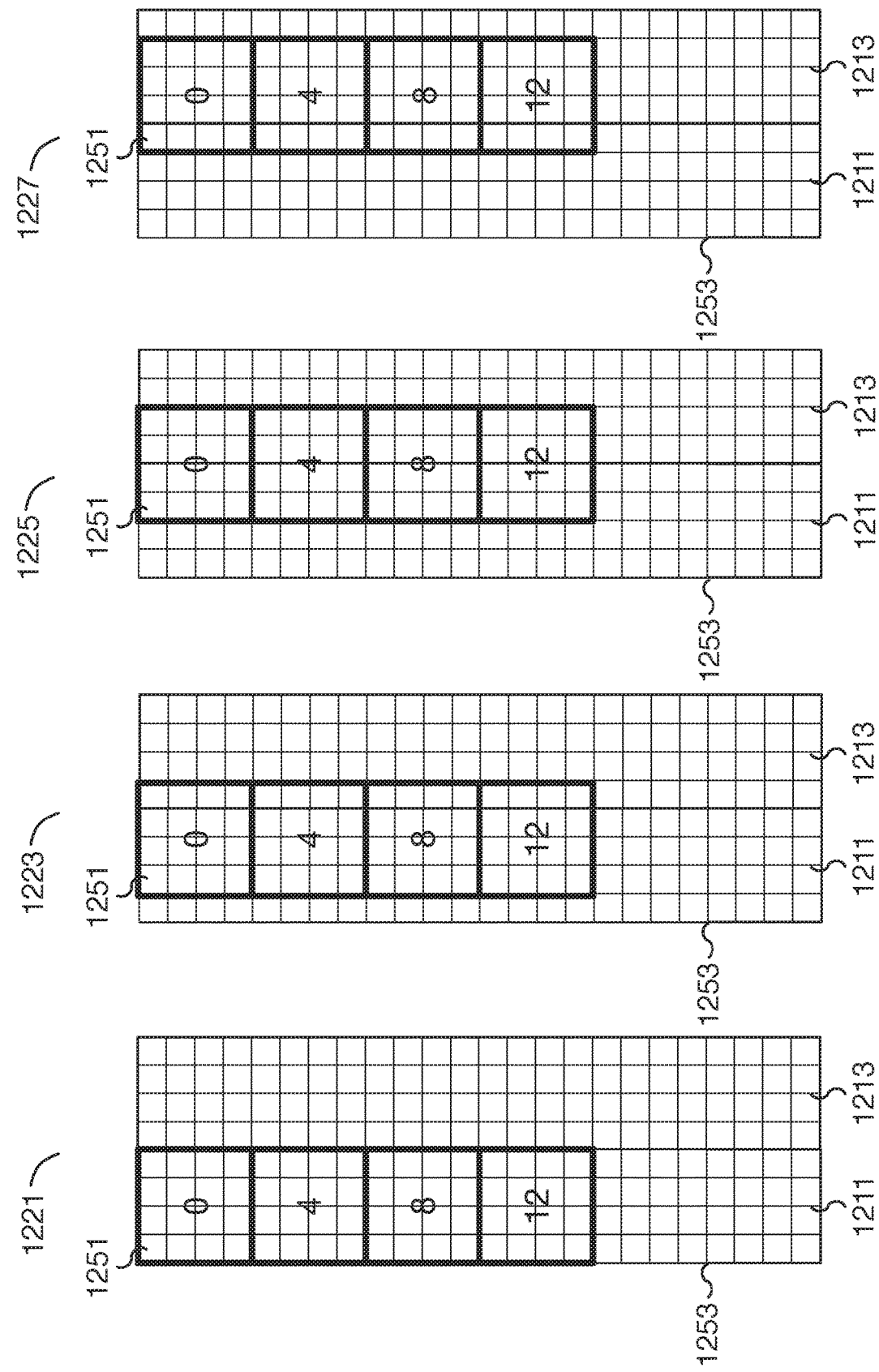

FIGS. 12A, 12B, and 12C are diagrams illustrating an embodiment of a search segment and corresponding source block column. The diagrams of FIGS. 12A, 12B, and 12C correspond to the process for performing a portion of a unified motion estimation search as described with respect to FIGS. 1-6. FIGS. 12A, 12B, and 12C include source block column 1251 and search segment 1253. Source block column 1251 includes sub-blocks numbered 0, 4, 8, and 12. Search segment 1253 is made up of partial search segments 1211 and 1213. In the example shown, partial search segments 1211 and 1213 together make up an 8×24 pixel search segment 1253 that is searched using 4×16 pixel source block column 1251 using 4×4 pixel sub-blocks. The FIGS. 12A and 12B depict the different vertical offsets of source block column 1251 for searching a column of sub-blocks of search segment 1253. Although FIGS. 12A and 12B show each source block column 1251 utilizing the same horizontal offset (zero pixels from the left edge of search segment 1253), different horizontal offsets are applied to source block column 1251 when searching different sub-block columns of search segment 1253. For example, each source block column 1251 of FIGS. 12A and 12B can be offset 0, 1, 2, and 3 pixels from the left edge of search segment 1253. The different corresponding horizontal offsets are shown in FIG. 12C for a single vertical offset (zero pixels from the top edge of search segment 1253). In the example shown, FIG. 12C depicts the different horizontal offsets of source block column 1251. Although FIG. 12C shows each source block column 1251 utilizing the same vertical offset (zero pixels from the top edge of search segment 1253), the different horizontal offsets shown in FIG. 12C are applicable for each vertical offset shown in FIGS. 12A and 12B. In various embodiments, the different columns of sub-blocks of search segment 1253 (corresponding to different horizontal offsets) are searched by applying the horizontal offsets depicted in FIG. 12C to each of the vertical offsets depicted in FIGS. 12A and 12B.

In FIGS. 12A and 12B, the different vertical offsets are shown as alignment positions 1201, 1203, 1205, 1207, 1209, 1211, 1213, and 1215, with source block column 1251 associated with a different starting vertical offset for each alignment position. For example, alignment position 1201 shows source block column 1251 aligned with the top of search segment 1253. At alignment position 1203, the top of source block column 1251 is one pixel lower than alignment position 1201. At alignment position 1205, the top of source block column 1251 is two pixels lower than alignment position 1201, and so forth. At alignment position 1215, the top of source block column 1251 is seven pixels lower than alignment position 1201. By associating source block column 1251 with search segment 1253 in accordance with each of alignment positions 1201, 1203, 1205, 1207, 1209, 1211, 1213, and 1215, an entire column of sub-blocks of search segment 1253 can be searched and motion estimates determined.

In FIGS. 12A and 12B, only the alignment of source block column 1251 with the left most column of sub-blocks of search segment 1253 is shown. To perform a complete motion estimation search of search segment 1253, the vertical alignments for source block column 1251 shown in FIGS. 12A and 12B are applied to each horizontal alignment position of source block column 1251 as shown in FIG. 12C. In the example shown, FIG. 12C depicts the different starting horizontal offsets that are applied to source block column 1251 for searching the columns of sub-blocks when using the vertical offsets of FIGS. 12A and 12B. The different horizontal offsets are shown as alignment positions 1221, 1223, 1225, and 1227, with source block column 1251 associated with a different starting horizontal offset for each alignment position. For example, alignment position 1221 shows source block column 1251 aligned with the left edge of search segment 1253. At alignment position 1223, the left of source block column 1251 is one pixel to the right compared to alignment position 1221. At alignment position 1225, the left of source block column 1251 is two pixels to the right compared to alignment position 1221. At alignment position 1227, the left of source block column 1251 is three pixels to the right compared to alignment position 1221. By pairing the different horizontal alignment positions of FIG. 12C with the different vertical alignment positions of FIGS. 12A and 12B, for 8×24 pixel search segment 1253 and 4×16 pixel source block column 1251, 32 different alignment positions exist and are each searched for motion estimates.

In some embodiments, each of the possible alignment positions is searched in a single cycle by a unified search unit such as unified search unit 1409 of FIG. 14. For example, frame data corresponding to source block column 1251 and corresponding sub-blocks of search segment 1253 is compared concurrently for each possible alignment position. In some embodiments, the alignment and association of sub-blocks of source block column 1251 with different locations of search segment 1253 is performed at 403 of FIG. 4. In some embodiments, the different alignments are searched to determine motion estimates at 405 of FIG. 4 and/or at 505 of FIG. 5.

In the examples of FIGS. 12A, 12B, and 12C, the bottom row and right column of pixels of search segment 1253 is not searched. In various embodiments, these corresponding locations are searched when processing a neighboring search segment using the same techniques described herein.

In some embodiments, search segment 1253 corresponds to top partial search segments 1011 and 1013 of FIG. 10 and/or bottom partial search segments 1111 and 1113 of FIG. 11. In some embodiments, source block column 1251 is the left source block column of source frame block 700 of FIG. 7 and/or of source frame block 901 of FIG. 9. Although described with respect to the left source block column of a source frame block, the alignment offsets of FIGS. 12A, 12B, and 12C of the source block column within a search segment are appropriately applied to each column of a source frame block to the corresponding search segments of that source block column to search the entire search region using the entire search frame block.

FIGS. 13A-G are diagrams illustrating different embodiments of partition configurations utilizing a sub-block unit. Motion estimations for the depicted partition configurations are determined using the results of motion estimations performed using sub-blocks that make up the corresponding partition. In the examples of FIGS. 13A-G, each sub-block is a 4×4 pixel block. The different partition configurations utilize different combinations of the 4×4 pixel sub-blocks. In some embodiments, the motion estimates for one or more of the different partition configurations are performed at least in part concurrently using the results of the sub-block motion estimates. In some embodiments, the motion estimates for the partition configurations are performed as part of the processes of FIGS. 1-6 and in particular at 407 of FIG. 4 and/or at 505 and/or 513 of FIG. 5. In some embodiments, the motion estimates for the partition configurations are performed using motion estimation search processing unit 1400 of FIG. 14 and, in particular, using unified search unit 1409 of FIG. 14.

Figure 13A:
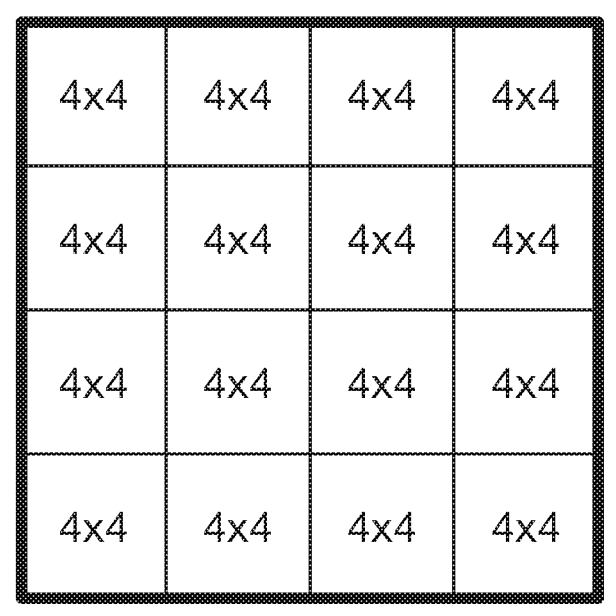

FIG. 13A shows a 4×4 pixel partition configuration. In this configuration, each partition is a 4×4 pixel block and is equivalent in size to a sub-block. No additional combination of sub-blocks is needed. When performing a motion estimation search using a 16×16 source frame block, motion estimations are determined for sixteen partitions for each corresponding reference block.

Figure 13B:
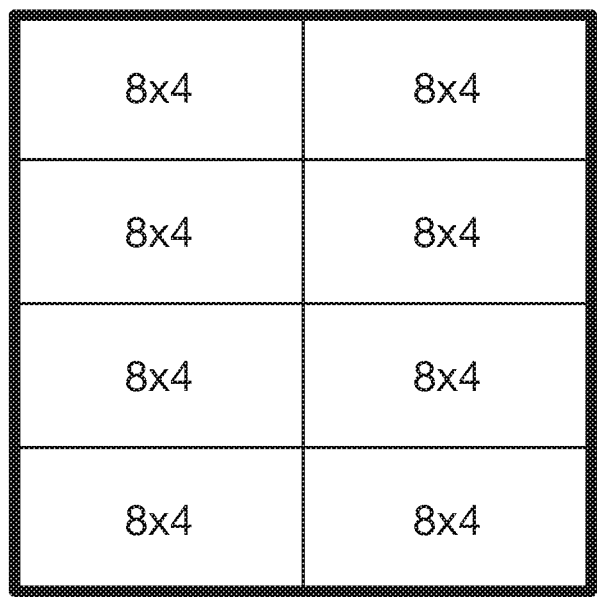

FIG. 13B shows an 8×4 pixel partition configuration. In this configuration, each partition is an 8×4 pixel block and is equivalent in size to two sub-blocks arranged side-by-side. The motion estimate results of two corresponding sub-blocks are combined to determine the motion estimate of an 8×4 partition. When performing a motion estimation search using a 16×16 source frame block, motion estimations are determined for eight partitions for each corresponding reference block.

Figure 13C:
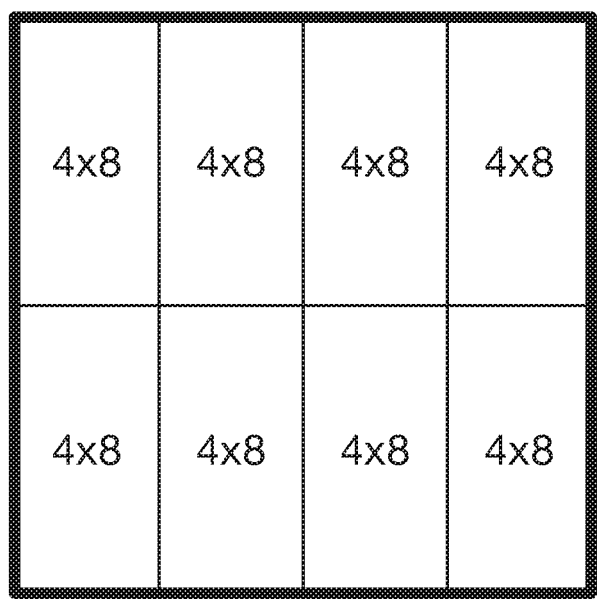

FIG. 13C shows a 4×8 pixel partition configuration. In this configuration, each partition is a 4×8 pixel block and is equivalent in size to two sub-blocks stacked vertically. The motion estimate results of two corresponding sub-blocks are combined to determine the motion estimate of a 4×8 partition. When performing a motion estimation search using a 16×16 source frame block, motion estimations are determined for eight partitions for each corresponding reference block.

Figure 13D:
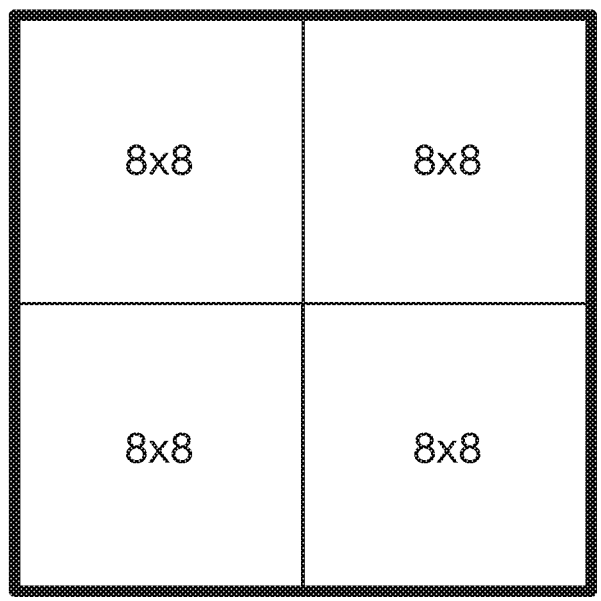

FIG. 13D shows an 8×8 pixel partition configuration. In this configuration, each partition is an 8×8 pixel block and is equivalent in size to four sub-blocks arranged two sub-blocks wide and two sub-blocks tall. The motion estimate results of four corresponding sub-blocks are combined to determine the motion estimate of an 8×8 partition. When performing a motion estimation search using a 16×16 source frame block, motion estimations are determined for four partitions for each corresponding reference block.

Figure 13E:
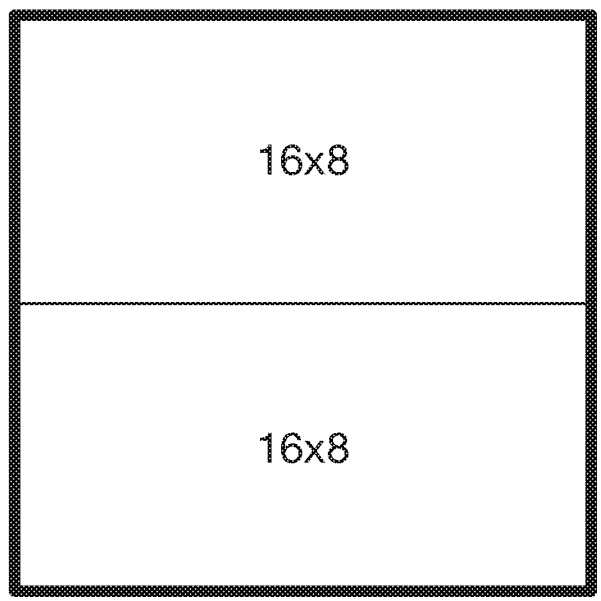

FIG. 13E shows a 16×8 pixel partition configuration. In this configuration, each partition is a 16×8 pixel block and is equivalent in size to eight sub-blocks arranged four sub-blocks wide and two sub-blocks tall. The motion estimate results of eight corresponding sub-blocks are combined to determine the motion estimate of a 16×8 partition. When performing a motion estimation search using a 16×16 source frame block, motion estimations are determined for two partitions for each corresponding reference block.

Figure 13F:
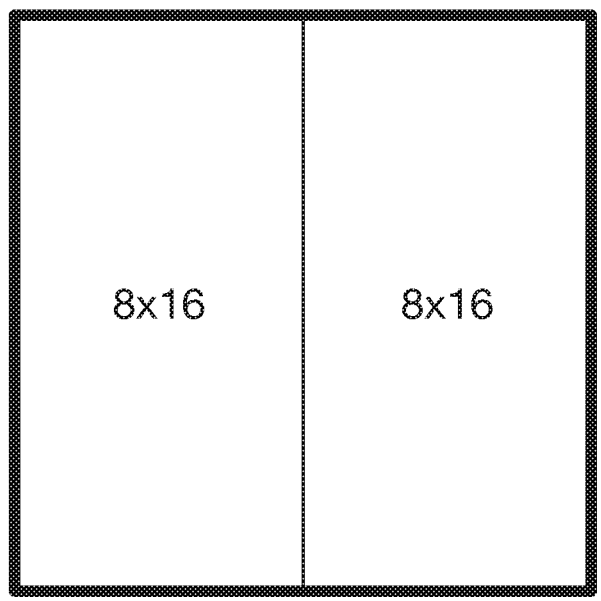

FIG. 13F shows an 8×16 pixel partition configuration. In this configuration, each partition is an 8×16 pixel block and is equivalent in size to eight sub-blocks arranged two sub-blocks wide and four sub-blocks tall. The motion estimate results of eight corresponding sub-blocks are combined to determine the motion estimate of an 8×16 partition. When performing a motion estimation search using a 16×16 source frame block, motion estimations are determined for two partitions for each corresponding reference block.

Figure 13G:
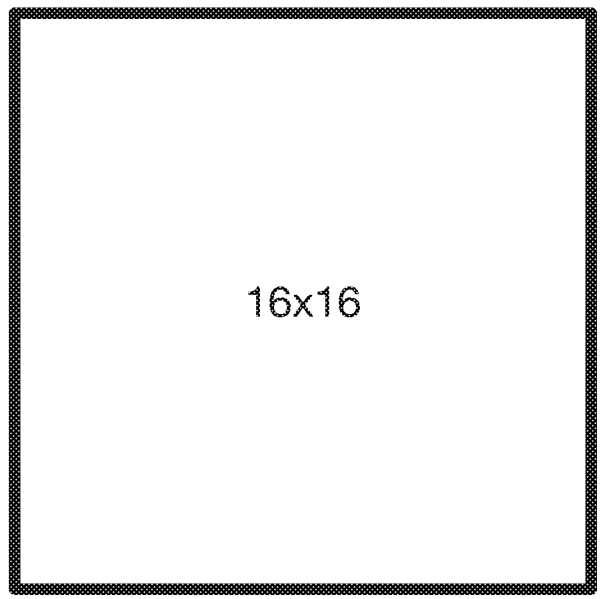

FIG. 13G shows a 16×16 pixel partition configuration. In this configuration, each partition is a 16×16 pixel block and is equivalent in size to sixteen sub-blocks arranged four sub-blocks wide and four sub-blocks tall. The motion estimate results of all sixteen corresponding sub-blocks are combined to determine the motion estimate of a 16×16 partition. When performing a motion estimation search using a 16×16 source frame block, motion estimations are determined for one partition for each corresponding reference block.

FIG. 14 is a block diagram illustrating an embodiment of a motion estimation search processing unit for performing hierarchical motion search. In the example shown, motion estimation search processing unit 1400 is a motion estimation search processing unit that can be utilized for hierarchical motion search. Motion estimation search processing unit 1400 includes control unit 1401, source buffer 1403, reference frame line buffer 1405, motion buffer 1407, and unified search unit 1409. Motion estimation search processing unit 1400 receives input program control 1411, source input 1413, reference input 1415, motion predictors 1417, and output motion estimate search results 1419. In some embodiments, multiple instances of motion estimation search processing unit 1400 are utilized to process multiple reference frames concurrently. By configuring a system with multiple motion estimation search processing units, such as motion estimation search processing unit 1400, multiple reference frames can be searched concurrently using the same source block. In various embodiments, motion estimation search processing unit 1400 is utilized to perform at least in part one or more of the processes of FIGS. 1-6. In some embodiments, motion estimation search processing unit 1400 is part of a larger hierarchical motion search processing system and includes additional components not shown. For example, in some embodiments, a hierarchical motion search processing system includes memory (not shown), such as external memory, from which source frames and reference frames are retrieved.

In some embodiments, input program control 1411 is a program control signal used in connection with control unit 1401 to control the operation of motion estimation search processing unit 1400. In some embodiments, program control 1411 is a program control input. Program control 1411 may be used to direct and provide instructions to control unit 1401 for controlling and performing a motion search operation. The control functionality may include controlling a variety of operating parameters for motion search. In some embodiments, program control 1411 and control unit 1401 control the motion vector parameters such as the size of the search window and the partition size(s) to calculate, the search region, the number of motion vector candidates to propagate, whether to utilize motion predictions, the number of motion searches to perform, access to reference frame line buffer 1405, utilization of motion estimates from motion buffer 1407, etc.

In some embodiments, input source input 1413 is used to receive a source block for storing in source buffer 1403. In some embodiments, source input 1413 is an external source block input. Source buffer 1403 stores a source block that is used in a motion search. In various embodiments, the source block stored in source buffer 1403 corresponds to a portion of a source frame of a video. For example, in some embodiments, the source block is a 16×16 pixel source block or another appropriately sized source block. The video may be a subsampled version of the video for performing hierarchical motion search. The source block stored in source buffer 1403 is transmitted to unified search unit 1409 for performing motion searches on reference data.

In some embodiments, reference input 1415 provides reference frame data to motion estimation search processing unit 1400 where it is stored in reference frame line buffer 1405. In some embodiments, reference input 1415 is a reference input for reference frame data. In various embodiments, the received reference frame data corresponds to at least a portion of a reference frame of a video assigned to motion estimation search processing unit 1400 and is used to perform a motion search. Reference frame line buffer 1405 stores the received reference data, which is provided as appropriate to unified search unit 1409. For example, reference data corresponding to a search region is provided to unified search unit 1409 from reference frame line buffer 1405. In various embodiments, the reference data corresponding to a reference frame is received from reference input 1415 as entire rows of the reference frame. As rows are no longer needed, a new row is received from reference input 1415 and stored in reference frame line buffer 1405. In some embodiments, the rows of the reference frame are received at reference frame line buffer 1405 starting with the top row and finishing with the bottom row of the reference frame. In some embodiments, the search regions provided from reference frame line buffer 1405 to unified search unit 1409 traverse the reference data in reference frame line buffer 1405 from left to right of the reference frame.

In some embodiments, motion estimation search processing unit 1400 can receive motion estimate candidates from input motion predictors 1417. In some embodiments, input motion predictors 1417 is an input for motion predictors. Input motion predictors 1417 provide optional predictors that can be used as starting candidate(s) for a motion search. Motion buffer 1407 stores both received motion predictors (as motion estimate candidates) from input motion predictors 1417 and motion search results (as motion estimate candidates) from output motion estimate search results 1419. In some embodiments, motion buffer 1407 also stores one or more zero motion vectors. In various embodiments, motion buffer 1407 internally includes a multiplexer (not shown) and is configured to send motion predictors from input motion predictors 1417, output motion estimate search results 1419, and/or zero motion vectors to unified search unit 1409. In various embodiments, motion buffer 1407 stores the best candidates based on motion estimate results for a further higher resolution search. For example, the best motion estimate candidates may be initialized with input motion predictors 1417. As motion search results are performed, the initial candidates may be replaced with better candidates from output motion estimate search results 1419. The candidates may be intermediate motion search results that are refined as the search progresses. In some embodiments, the candidates are motion search results from a previous search pass. For example, the candidates are results from a lower resolution search using a version of the source video down-sampled by a larger factor, such as by a factor of 16. In various embodiments, motion estimate candidates correspond to areas in the reference data that best match a source block. In some embodiments, the motion estimate candidates may be represented as a vector such as a motion vector.

In some embodiments, unified search unit 1409 receives operating control signals from control unit 1401, a source block from source buffer 1403, a search region of a reference frame from reference frame line buffer 1405, and optional motion estimate candidates from motion buffer 1407. Unified search unit 1409 performs a motion search on the search region using the source block. In some embodiments, the search may be initiated with the best motion estimate candidates. For example, the motion estimate candidates provided from motion buffer 1407 may be used to improve search performance by providing an optimized starting location. In some embodiments, the motion estimate candidates provided from motion buffer 1407 are used to propagate the best motion estimate results after completing searches on different resolutions of the source video. For example, search results performed on a version of the video down-sampled by a factor of 16 are used to help refine the search performed on a version of the video down-sampled by a factor of 4. In various embodiments, the search region provided from reference frame line buffer 1405 traverses the reference data stored in reference frame line buffer 1405 from left to right and top to bottom. For example, for a particular source block, multiple search regions are provided via reference frame line buffer 1405. For each particular source block, a motion search is performed on multiple search regions of a reference frame to determine the best matches of the source block in the reference frame. After each search region is searched, motion estimate search results are outputted via output motion estimate search results 1419. The results may be stored in motion buffer 1407 as additional higher resolution references are searched. Once all entire search areas are complete, for example, all candidates are searched using a source block, the motion estimate search results are outputted from motion estimation search processing unit 1400 via output motion estimate search results 1419.

In some embodiments, unified search unit 1409 is configured to perform a motion search on reference data, such as a reference frame, using search regions received from reference frame line buffer 1405 and a source block received via source buffer 1403. Once a search on a search region is completed, a new search region may be provided to unified search unit 1409. In some embodiments, the new search region traverses the reference data in reference frame line buffer 1405 from left to right and top to bottom until the entire row of a reference frame is no longer needed and can be replaced in reference frame line buffer 1405 with a new row of reference data of the reference frame.

In some embodiments, motion estimate search results from unified search unit 1409 include search results for more that one search partition configuration. For example, search results can cover a 4×4, 4×8, 8×4, 8×8, 8×16, 16×8, 16×16, or another appropriately sized search region. In some embodiments, unified search unit 1409 computes motion estimates for a sub-block of the source block and then aggregates sub-block results to determine corresponding results for one or more larger partition configurations made up of multiple sub-blocks. For example, results for 4×8 and 8×4 partitions are computed by summing two appropriate 4×4 sub-block partitions. Results for 8×8 partitions are computed by summing four appropriate 4×4 sub-block partitions. Results for 8×16 and 16×8 partitions are computed by summing eight appropriate 4×4 sub-block partitions. Results for 16×16 partitions are computed by summing 16 appropriate 4×4 sub-block partitions.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system comprising:
a memory storage configured to store at least a portion of a first frame and a second frame of a video; and
a plurality of hardware motion estimation search processing units configured to perform at least a portion of motion estimation searches for the video for a plurality of different frames and a plurality of different block sizes in parallel, including by being configured to perform the motion estimation searches for the plurality of different frames in parallel using a plurality of source sub-blocks of a first block size to determine a first type of comparison evaluation values for the first block size of a first video format and, separate from the determination of the first type of comparison evaluation values, calculate a combination of values included in the first type of comparison evaluation values as at least one second type of comparison evaluation value representing a motion estimate of a block of a second block size of a second video format different from the first video format as a part of a combined unified motion estimation search targeting multiple video formats during the same combined unified motion estimation search using a combined unified process that targets together each of the multiple video formats to determine together based on properties of the multiple video formats at least the first type of comparison evaluation values and the second type of comparison evaluation value, wherein the second block size is larger than the first block size, and wherein the hardware motion estimation search processing unit is configured to utilize at least a portion of the first type of comparison evaluation values for the first block size and the at least one second type of comparison evaluation value assigned to the block of the second block size as a common basis in encoding the video into the multiple video formats.

2. The system of claim 1, wherein the first frame of the video and the second frame of the video are reference frames of the video.

3. The system of claim 2, wherein the first frame of the video is a down-sampled version of an original video.

4. The system of claim 3, wherein the down-sampled version of the original video was down-sampled by a factor of 16 or by a factor of 4.

5. The system of claim 1, wherein the first block size is a 4×4 pixel block.

6. The system of claim 5, wherein the second block size is a 4×8, 8×4, 8×8, 8×16, 16×8, or 16×16 pixel block.

7. The system of claim 1, wherein the plurality of source sub-blocks are arranged as a column.

8. The system of claim 7, wherein the column includes exactly four sub-blocks.

9. The system of claim 8, wherein the plurality of source sub-blocks are a portion of a source frame block.

10. The system of claim 9, wherein the source frame block is a 16×16 pixel block.

11. The system of claim 1, wherein at least one of the hardware motion estimation search processing units is configured to determine the first type of comparison evaluation values including by being configured to utilize a sum of absolute differences measurement.

12. The system of claim 1, wherein at least one of the hardware motion estimation search processing units is configured to determine the at least one second type of comparison evaluation value including by being configured to utilize a sum of absolute differences measurement.

13. The system of claim 1, wherein the hardware motion estimation search processing units are configured to perform at least the portion of the motion estimation searches for the video at least in part concurrently for the plurality of different block sizes.

14. The system of claim 1, wherein at least one of the hardware motion estimation search processing units is configured to determine the at least one second type of comparison evaluation value including by being configured to sum the combination of values included in the first type of comparison evaluation values.

15. A method, comprising:
storing at least a portion of a first frame and a second frame of a video; and
using a plurality of hardware motion estimation search processing units to perform at least a portion of motion estimation searches for the video for a plurality of different frames and a plurality of different block sizes in parallel, including by:
performing the motion estimation searches for the plurality of different frames in parallel using a plurality of source sub-blocks of a first block size to determine a first type of comparison evaluation values for the first block size of a first video format; and
separate from the determination of the first type of comparison evaluation values, calculating a combination of values included in the first type of comparison evaluation values as at least one second type of comparison evaluation value representing a motion estimate of a block of a second block size of a second video format different from the first video format as a part of a combined unified motion estimation search targeting multiple video formats during the same combined unified motion estimation search using a combined unified process that targets together each of the multiple video formats to determine together based on properties of the multiple video formats at least the first type of comparison evaluation values and the second type of comparison evaluation value;
wherein the second block size is larger than the first block size and wherein the hardware motion estimation search processing unit is configured to utilize at least a portion of the first type of comparison evaluation values for the first block size and the at least one second type of comparison evaluation value assigned to the block of the second block size as a common basis in encoding the video into the multiple video formats.

16. The method of claim 15, wherein the video is a down-sampled version of an original video.

17. The method of claim 15, wherein performing the motion estimation search using the plurality of source sub-blocks to determine the first type of comparison evaluation values includes utilizing a sum of absolute differences measurement.

18. The method of claim 15, further comprising identifying a motion vector based on the at least one second type of comparison evaluation value.

19. A computer program product embodied in a non-transitory computer readable medium and comprising computer instructions for:
 storing at least a portion of a first frame and a second frame of a video; and
 using a plurality of hardware motion estimation search processing units to perform at least a portion of motion estimation searches for the video for a plurality of different frames and a plurality of different block sizes in parallel, including by:
  performing the motion estimation searches for the plurality of different frames in parallel using a plurality of source sub-blocks of a first block size to determine a first type of comparison evaluation values for the first block size of a first video format; and
  separate from the determination of the first type of comparison evaluation values, calculating a combination of values included in the first type of comparison evaluation values as at least one second type of comparison evaluation value representing a motion estimate of a block of a second block size of a second video format different from the first video format as a part of a combined unified motion estimation search targeting multiple video formats during the same combined unified motion estimation search using a combined unified process that targets together each of the multiple video formats to determine together based on properties of the multiple video formats at least the first type of comparison evaluation values and the second type of comparison evaluation value;
 wherein the second block size is larger than the first block size, and wherein the hardware motion estimation search processing unit is configured to utilize at least a portion of the first type of comparison evaluation values for the first block size and the at least one second type of comparison evaluation value assigned to the block of the second block size as a common basis in encoding the video into the multiple video formats.

20. The computer program product of claim 19, wherein the first frame of the video and the second frame of the video are reference frames of the video.

\* \* \* \* \*